(12) United States Patent
Henderson

(10) Patent No.: US 11,884,136 B2
(45) Date of Patent: *Jan. 30, 2024

(54) SYSTEM AND METHOD FOR IDLE MITIGATION ON A UTILITY TRUCK WITH AN ELECTRICALLY ISOLATED HYDRAULICALLY CONTROLLED AERIAL WORK PLATFORM

(71) Applicant: Terex USA, LLC, Westport, CT (US)

(72) Inventor: Tyler Craig Henderson, Marvin, SD (US)

(73) Assignee: Terex USA, LLC, Westport, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/549,264

(22) Filed: Dec. 13, 2021

(65) Prior Publication Data
US 2022/0234424 A1 Jul. 28, 2022

Related U.S. Application Data

(63) Continuation of application No. 15/700,301, filed on Sep. 11, 2017, now Pat. No. 11,220,160.

(60) Provisional application No. 62/396,452, filed on Sep. 19, 2016, provisional application No. 62/385,350, filed on Sep. 9, 2016.

(51) Int. Cl.
| B60H 1/32 | (2006.01) |
| B60H 1/00 | (2006.01) |
| B66F 11/04 | (2006.01) |
| B60K 25/02 | (2006.01) |

(52) U.S. Cl.
CPC ......... *B60H 1/3222* (2013.01); *B60H 1/0045* (2013.01); *B60H 1/00428* (2013.01); *B66F 11/044* (2013.01); *B60H 2001/3273* (2013.01); *B60K 25/02* (2013.01); *B60K 2025/026* (2013.01)

(58) Field of Classification Search
CPC ......................... B60H 1/3222; B60H 1/00428; B60H 1/0045; B60H 2001/3273; B66F 11/044; B60K 25/02
See application file for complete search history.

(56) References Cited

U.S. PATENT DOCUMENTS

| 3,841,108 | A | * | 10/1974 | Pierrat | ................. | B60H 1/3222 |
| | | | | | | 62/239 |
| 5,904,050 | A | * | 5/1999 | Nathan | ................ | B60H 1/3208 |
| | | | | | | 60/449 |
| 6,070,650 | A | * | 6/2000 | Inoue | ...................... | B60L 50/16 |
| | | | | | | 62/244 |
| 6,554,088 | B2 | * | 4/2003 | Severinsky | ............. | B60L 58/12 |
| | | | | | | 180/65.23 |
| 6,796,367 | B2 | * | 9/2004 | Blacquiere | ......... | B60H 1/00428 |
| | | | | | | 165/41 |
| 6,895,917 | B2 | * | 5/2005 | Itoh | ...................... | B60H 1/3208 |
| | | | | | | 62/133 |
| 7,287,583 | B2 | * | 10/2007 | Iwanami | ................. | F25B 27/00 |
| | | | | | | 62/133 |

(Continued)

*Primary Examiner* — Luis A Martinez Borrero
(74) *Attorney, Agent, or Firm* — Simmons Perrine Moyer Bergman PLC

(57) ABSTRACT

An idle mitigation system for a bucket truck which includes an alternate source of power for the vehicle air conditioner which is coupled to the hydraulic system of the bucket truck which hydraulic system is alternately powered by an electric motor which, when run in reverse, can charge batteries.

20 Claims, 46 Drawing Sheets

(56) References Cited

U.S. PATENT DOCUMENTS

| | | | | |
|---|---|---|---|---|
| 8,030,880 B2* | 10/2011 | Alston | H02J 7/1423 | 320/103 |
| 8,256,399 B2* | 9/2012 | Gamache | F02N 11/0803 | 123/343 |
| 8,429,924 B2* | 4/2013 | Ratliff | F04D 13/06 | 62/323.3 |
| 8,443,613 B2* | 5/2013 | Quisenberry | B60H 1/00478 | 62/3.61 |
| 8,464,526 B2* | 6/2013 | Renner | F04B 17/05 | 60/449 |
| 8,616,323 B1* | 12/2013 | Gurin | B60K 6/12 | 180/165 |
| 8,776,928 B2* | 7/2014 | Stover, Jr. | B60H 1/00428 | 180/165 |
| 8,863,540 B2* | 10/2014 | Alston | F25B 27/00 | 62/236 |
| 9,073,546 B2* | 7/2015 | Kuroda | B60L 1/003 | |
| 9,216,628 B2* | 12/2015 | Self | B60H 1/00428 | |
| 10,118,464 B2* | 11/2018 | Herrmann | B60H 1/3208 | |
| 10,183,547 B2* | 1/2019 | Hall | F02N 11/084 | |
| 11,220,160 B2* | 1/2022 | Henderson | B60H 1/00428 | |
| 2001/0039230 A1* | 11/2001 | Severinsky | B60W 20/30 | 180/65.23 |
| 2002/0157414 A1* | 10/2002 | Iwanami | B60H 1/323 | 165/254 |
| 2004/0200230 A1* | 10/2004 | Holt | B60H 1/00435 | 62/239 |
| 2005/0109499 A1* | 5/2005 | Iwanami | B60H 1/00778 | 62/239 |
| 2006/0116797 A1* | 6/2006 | Moran | B60L 58/20 | 180/65.245 |
| 2006/0245944 A1* | 11/2006 | Leck | B60H 1/3222 | 417/364 |
| 2007/0101708 A1* | 5/2007 | Ohigashi | E02F 9/2246 | 60/431 |
| 2007/0113571 A1* | 5/2007 | Park | B60H 1/004 | 62/235.1 |
| 2007/0124037 A1* | 5/2007 | Moran | B60W 10/06 | 701/22 |
| 2009/0120115 A1* | 5/2009 | Hamilton | B60H 1/3222 | 62/323.3 |
| 2009/0193800 A1* | 8/2009 | Peters | E02F 9/2242 | 417/364 |
| 2009/0202370 A1* | 8/2009 | Fujii | H01M 16/006 | 417/411 |
| 2009/0263259 A1* | 10/2009 | Picton | B60H 1/3222 | 417/364 |
| 2009/0266097 A1* | 10/2009 | Hamilton | B60H 1/3222 | 62/236 |
| 2010/0050659 A1* | 3/2010 | Quisenberry | F28D 15/0275 | 62/3.61 |
| 2010/0089563 A1* | 4/2010 | Sundhar | B60H 1/00428 | 165/61 |
| 2010/0100306 A1* | 4/2010 | Gamache | F02N 11/0803 | 701/113 |
| 2010/0145562 A1* | 6/2010 | Moran | B60W 20/13 | 180/65.28 |
| 2010/0154449 A1* | 6/2010 | Stover, Jr. | B60H 1/3232 | 62/323.3 |
| 2010/0180614 A1* | 7/2010 | Larson | B60H 1/005 | 165/104.11 |
| 2010/0199655 A1* | 8/2010 | Renner | F04B 17/05 | 60/431 |
| 2011/0046854 A1* | 2/2011 | Kooi | B60H 1/3222 | 701/48 |
| 2011/0114405 A1* | 5/2011 | Perhats | B60H 1/3222 | 180/68.1 |
| 2011/0288743 A1* | 11/2011 | Smith | B60L 50/61 | 701/102 |
| 2012/0055175 A1* | 3/2012 | Ting | F25B 27/00 | 62/133 |
| 2015/0013357 A1* | 1/2015 | Stockbridge | F02D 41/0205 | 62/126 |
| 2015/0019078 A1* | 1/2015 | Jung | F04B 23/04 | 701/41 |
| 2015/0107814 A1* | 4/2015 | Jeong | B60L 1/003 | 165/202 |
| 2015/0267725 A1* | 9/2015 | Wang | B60H 1/00435 | 60/670 |
| 2016/0339900 A1* | 11/2016 | Li | B60H 1/00885 | |
| 2017/0349078 A1* | 12/2017 | Dziuba | B60H 1/00428 | |
| 2018/0154738 A1* | 6/2018 | Henderson | B60H 1/0045 | |
| 2018/0326813 A1* | 11/2018 | Ganiere | B60R 16/03 | |
| 2019/0077216 A1* | 3/2019 | Andrews | B60H 1/3223 | |
| 2022/0281286 A1* | 9/2022 | Andrews | B60H 1/00428 | |

* cited by examiner

TABLE 1

| Number of Truck Start | 20 | starts |
| Run Time Per Start | 5 | min/start |
| Hydraulic Time before start | 20 | seconds |

| Duty Cycle | HRS | EPTO Speed | CC/Rev | GPM | Pressure | HP | Watts | KWH | Torque Output |
|---|---|---|---|---|---|---|---|---|---|
| Hydraulic Idle Time | 4.22 | 700 | 9 | 1.7 | 80 | 0.08 | 58 | 0.27 | 7.0 |
| PTO time | 0.11 | 3400 | 9 | 8.1 | 2750 | 12.97 | 9672 | 1.18 | 240.5 |
| PTO Charge | 1.67 | | | | | | -600 | -0.75 | 0.0 |
| Driving (40 miles) | 1 | Assume drive time is at beginning and end of day - no benefit to worksite battery | | | | | | 0.00 | 0.0 |
| Breaks - Lunch (30 min) | 1 | 700 | 9 | 1.7 | 80 | 0.08 | 58 | 0.06 | 7.0 |
| Moring prep / site prep | 1.25 | 700 | 9 | 1.7 | 80 | 0.08 | 58 | 0.08 | 7.0 |
| Misc Worksite Duties | 0.75 | 700 | 9 | 1.7 | 80 | 0.08 | 58 | 0.05 | 7.0 |
| | 10.00 | | | | | | Total | 0.89 | 0.0 |

| | | | | | | | | | Torque | PSI | AmpS |
|---|---|---|---|---|---|---|---|---|---|---|---|
| 1 Minute of Hydraulic Power | 1.00 | 1500 | 6 | 2.4 | 2200 | 3.05 | 2276 | 2.28 | 128.3 | | |
| 1 Minute of Hydraulic Power | 1.00 | 1200 | 6 | 1.9 | 490 | 0.54 | 405 | 0.41 | 28.6 | 311 | |
| 1 Minute of Hydraulic Power | 1.00 | 1100 | 6 | 1.7 | 2000 | 2.03 | 1517 | 1.52 | 116.6 | 290 | 490.2485 |
| 1 Minute of A/C Power | 1.00 | 1000 | 6 | 1.6 | 1900 | 1.76 | 1310 | 1.31 | 110.8 | 290 | 16 |

| | RPM | CC/Rev | Flow (GPM) | Max Press | HP | Watts | KWH | Torque Output (inlbs) | Calculated Torque Output (Nm) |
|---|---|---|---|---|---|---|---|---|---|
| 3150 RPM | 3150 | 6 | 5.0 | 2750 | 8.01 | 5974 | 0.00 | 160.3 | 18 |
| 1000 RPM | 1000 | 6 | 1.6 | 120 | 0.11 | 83 | 0.00 | 7.0 | 1 |

FIGURE 44

TABLE 2

Number of Truck Start: 15 starts
Run Time Per Start: 2 min/start
Hydraulic Time before start: 20 seconds

| Duty Cycle | HRS | EPTO Speed | CC/Rev | GPM | Pressure | HP | Watts | KWH |
|---|---|---|---|---|---|---|---|---|
| Hydraulic Idle Time | 4.42 | 1000 | 6 | 1.6 | 120 | 0.11 | 83 | 0.37 |
| PTO time | 0.08 | 3400 | 6 | 5.4 | 2750 | 8.65 | 6448 | 0.54 |
| PTO Charge | 0.50 | | | | | | -600 | -0.30 |
| Driving (40 miles) | 1 | | | | | | | 0.00 |
| Breaks - Lunch (30 min) (A/C Running) | 1 | 1200 | 6 | 1.9 | 1500 | 1.66 | 1241 | 1.24 |
| Breaks - Truck Charge Time | | | | | | | -600 | 0.00 |
| Moring prep / site prep | 1.25 | 1000 | 6 | 1.6 | 120 | 0.11 | 83 | 0.10 |
| Misc Worksite Duties | 0.75 | 1000 | 6 | 1.6 | 120 | 0.11 | 83 | 0.06 |
| | 9.00 | | | | | | Total | 2.01 |
| 1 Minute of Hydraulic Power | 0.02 | 3400 | 6 | 5.4 | 2500 | 7.86 | 5862 | 0.10 |
| 1 Minute of A/C Power | 1.00 | 3400 | 6 | 5.4 | 1500 | 4.72 | 3517 | 3.52 |

FIGURE 45

SYSTEM AND METHOD FOR IDLE MITIGATION ON A UTILITY TRUCK WITH AN ELECTRICALLY ISOLATED HYDRAULICALLY CONTROLLED AERIAL WORK PLATFORM

CROSS REFERENCE TO RELATED APPLICATIONS

The present application is a continuation application of the non-provisional patent application having Ser. No. 15/700,301 filed on Sep. 11, 2017, which non-provisional application claims the benefit of the filing date of provisional patent application having Ser. No. 62/385,350 filed on Sep. 9, 2016 by the same inventor, and the provisional application having Ser. No. 62/396,452 filed on Sep. 19, 2016, which applications are incorporated herein in their entirety by this reference.

FIELD OF THE INVENTION

The present invention generally relates to utility bucket trucks with insulated aerial work platforms, and more particularly relates to idle mitigation systems for use on insulated bucket trucks with hydraulic in-the-bucket controls.

BACKGROUND OF THE INVENTION

In the electrical and telecommunications industries, elevated work platforms (EWPs), such as aerial devices, are commonly used to position personnel for work on utility lines, utility poles, transformers, and other elevated equipment.

Such devices are also used for a range of other applications such as tree trimming, photography, and street and spotlight maintenance. These devices typically include a telescoping and/or articulating boom mounted on a truck bed or otherwise supported by a vehicle chassis. A personnel-carrying platform, also referred to as a bucket or basket, (which is often electrically isolated from the ground to protect the occupant from electrocution) is attached to a portion of the boom distal the vehicle chassis (i.e., the boom tip). Using a control interface located at the platform, for example, an operator may adjust the rotation, extension and articulation of the boom to best position the platform for access to a work site.

These trucks typically have a low duty cycle of hydraulic usage during a work day.

To preserve the ability to have full on demand access to hydraulics and/or air conditioning, these trucks are often left idling much of the day.

These trucks are often left idling much of the day to provide cabin comfort such as air conditioning.

Grip idle management system is an off-the-shelf system that is well known in the art and is effective in some applications.

U.S. Pat. No. 9,216,628 provides an idle management system which requires two air conditioning compressors and a need to tap into the refrigerant lines in the vehicles air conditioning system.

Consequently, there is a need for improved air conditioned and idle managed trucks with on-demand hydraulics.

SUMMARY OF THE INVENTION

It is an object of the present invention to provide alternative cab comfort operation when the engine is off without the need for a second air conditioning compressor and the need to tap into the vehicles refrigerant lines.

It is a feature of the present invention to include an alternate source of rotary power for driving an air conditioning compressor.

It is an advantage of the present invention to not require two air conditioning compressors and a need to tap into the refrigerant lines in the vehicles air conditioning system.

It is another object of the present invention to add the ability to provide increased rates of charging of a battery for auxiliary hydraulics and air conditioning without significant additional expense.

It is another feature of the present invention to utilize components of the alternate source for rotary power to drive the air conditioning compressor to charge the battery for the auxiliary hydraulics and the auxiliary air conditioning.

It is another advantage to reduce costs of an additional rapid charging capability.

It is still another object of the present invention to provide automatic operator initiation vehicle engine start-up commands without the addition of new communication equipment in the bucket.

It is still another feature to use a sensed increase in hydraulic pressure at the truck to determine that an engine start is needed.

It is still another advantage to avoid the need of adding RF or fiber optic communication equipment in the bucket.

It is yet another object of the present invention to improve consistency of hydraulic performance during times when vehicle engine is transitioning between off and on operational states.

It is yet another feature to provide increased pressure sensing and regulating capabilities for the hydraulic lines.

It is yet another advantage to improve safety by providing hydraulic bucket controls which are smooth and consistent during engine transition stages.

It is a further object of the present invention to reduce cost of an idle management system for air conditioned bucket trucks.

It is a further feature of the present invention to provide for prioritized timely sharing of auxiliary drive power for hydraulics and air conditioning.

It is a further advantage to eliminate the need for a separate electric motor to drive the auxiliary hydraulic pump and the auxiliary drive for the air conditioning compressor.

It is even a further object of the present invention to improve efficiency of an idle management system.

It is even a further object of the present invention to utilize operator-in-the-cab detection information and operator-in-the-bucket detection information.

It is even a further advantage of the present invention to automatically adjust commanded inside cabin temperature when an operator is detected in the bucket and not in the cab.

The present invention is designed to achieve the above-mentioned objects, include the previously stated features, and provide the aforementioned advantages.

The present invention is carried out in a dual air conditioning compressor-less system in the sense that only a single air conditioning compressor is required.

The present invention is carried out in a dual alternator-less system in the sense that an alternate source of charging batteries for the auxiliary hydraulics system and the auxiliary air condition system is accomplished without the need to add an additional alternator to the vehicle.

The present invention includes:

A method associated with an idle managed and air conditioned truck-mounted aerial work platform, the method comprising the steps of:

providing a first source of rotary power for driving an air conditioning compressor, where said first source of rotary power has a first connection with an engine of a vehicle;

providing a second source of rotary power for driving the air conditioning compressor on the vehicle;

driving a hydraulic pressure generator which has a first electrical connection to a source of stored electric energy;

causing said second source of rotary power for driving the air conditioning compressor to drive said air conditioning compressor when said first source of rotary power for driving the air conditioning compressor is unavailable; and said second source of rotary power for driving said air conditioning compressor is configured to utilize said first source of rotary power for driving the air conditioning compressor, when said engine of the vehicle is running, to charge said source of stored electric energy.

The present invention also includes:

A method associated with an idle managed and air conditioned truck-mounted aerial work platform, the method comprising the steps of:

providing a first source of rotary power for driving an air conditioning compressor, where said first source of rotary power has a first connection with an engine of a vehicle;

providing a second source of rotary power for driving the air conditioning compressor on the vehicle;

driving a hydraulic pressure generator which has a first electrical connection to a source of stored electric energy;

causing said second source of rotary power for driving the air conditioning compressor to drive said air conditioning compressor when said first source of rotary power for driving the air conditioning compressor is unavailable; and said second source of rotary power for driving said air conditioning compressor is configured to utilize said first source of rotary power for driving the air conditioning compressor, when said engine of the vehicle is running, to charge said source of stored electric energy.

BRIEF DESCRIPTION OF THE DRAWINGS

FIGS. 44-45 show tables for additional duty cycle information.

DETAILED DESCRIPTION OF THE INVENTION

Figure 1:
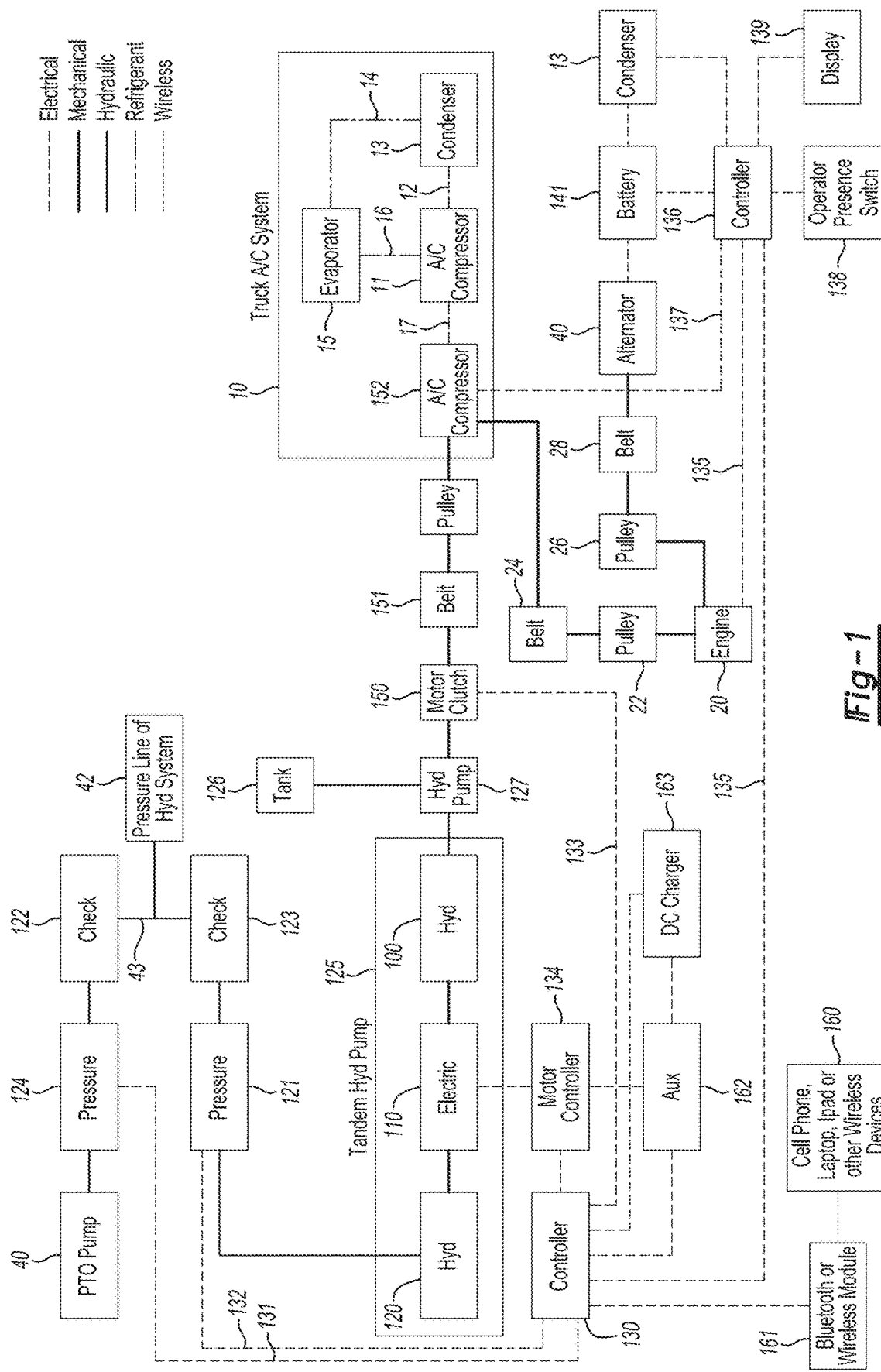
FIG. 1 is a schematic view of a system of the present invention.

Now referring to the drawings, wherein like numerals refer to like structure shown in the drawings and text included in the application throughout. The description below is directed to hydraulically controlled and air conditioned bucket trucks but the benefits of the present invention are applicable to vehicles which are equipped with on-demand hydraulics which are not bucket trucks and to air conditioned vehicles of all types. The following detailed description is intended to be an example of the many possible uses for the present invention. The invention described in detail below is for the purpose of illustration, it is to be understood that such detail is solely for that purpose and that variations can be made therein by those of ordinary skill in the art without departing from the spirit and scope of the invention as defined by the following claims, including all equivalents thereof.

Figure 43:
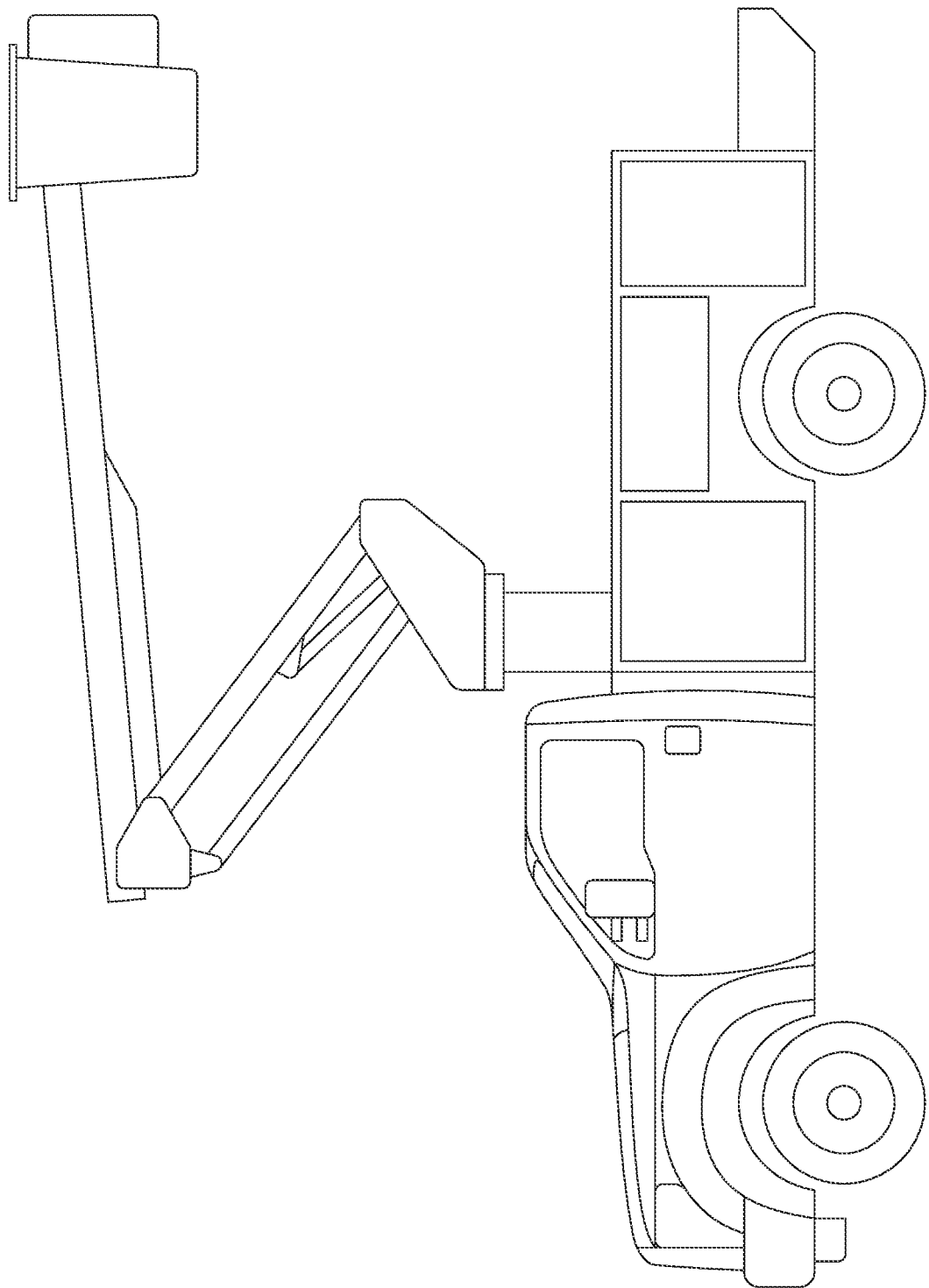
FIG. 43 represents the bucket truck of the present invention.

The present invention in one embodiment is a bucket truck as shown in FIG. 43 which is built on a commercially available truck chassis such as a Dodge 5500 but any appropriate truck chassis could be used. In the past, it has been well known to start the manufacture of a bucket truck with such a factory built road-ready vehicle. Many components such as the boom and the bucket have been added to the OEM chassis to make a finished bucket truck.

Now referring to FIG. 1, there is shown a schematic representation of a portion of the present invention. The upper right portion of this figure is the preferably unchanged OEM truck air conditioning system 10. Immediately below this is a representation of more unchanged OEM truck components but also mixed with new components. In one embodiment, the following components below the system 10 in the figure are unchanged OEM components: 20, 22, 24, 26, 28, 40, and 13. Everything in the figure to the left of the air conditioning compressor 152 is not a part of the OEM chassis except for the following components: 40 (however it could be ordered with the chassis). Note that tank 126 is included not with the chassis but with what is found in other hydraulic bucket trucks.

The present invention may begin with the OEM chassis with a commercially available idle management system having been added to it such as one made by grip idle management.

The present invention attempts to provide the operator in the bucket, at a time when the engine 20 is not running, with the ability to initiate the operation of the hydraulic controls 42 in the bucket by merely grasping them and manipulating them in the normal manner for operation of these controls. To accomplish this ability when the engine 20 and therefore the PTO pump 40 are not running, an electric auxiliary hydraulic pump 120 is included which provides hydraulic pressure to the pressure lines 42 of the hydraulic system which would run to and from the hand controls in the bucket. In a prior art bucket truck, the PTO pump 40 would be coupled directly to lines 42 and would provide the needed hydraulic pressure and flow to the bucket to provide typical functions when the engine is running.

In the present invention, the auxiliary hydraulic pump 120 is used to provide hydraulic pressure together with electric motor 110, and controllers 130 and 134. In general, the pressure transducers 121 and 124 detect when the PTO 40 is off and a demand is applied to the system through the system 42 (e.g. manipulation of the control handles in the bucket). A more thorough understanding of the hydraulic portions of the present invention can be achieved by utilizing details shown in FIG. 9. The capacity of the auxiliary battery 162 limits the amount of time that the electric motor can run without being recharged. See FIG. 10 for more details on battery.

Returning now to FIG. 1, when it is necessary to turn the engine 20 back on, the transition needs to be made so that the operator in the bucket truck does not experience problems with lag or excess flow, etc. (lag or overspeed of the boom). The transition could function as follows: When the engine 20 is deactivated by the idle management functions, the mechanical PTO pump 40 is deactivated while the auxiliary pump 120 is in standby mode.

This provides the system with low flow—low pressure. When the operator demands movement by activating the hydraulic valves 42, a load is detected by an increase in the pressure of the working fluid by pressure transducer 121. The controllers 130 and 134 of the system signals the electric motor 110 to provide maximum flow. The auxiliary pump 120 is then responsible for full movement and a signal is sent via line 135, controller 136 and a line to the engine 20 to start. During this transition, the engine responds and achieves designated RPM, the mechanical PTO 40 is activated and provides an additional flow. By monitoring the pressures (121 and 124) of the mechanical PTO 40 and auxiliary pump 120, the system then signals the electric motor 110, which causes the auxiliary pump 120 to deactivate so the boom speed is maintained.

Consequences of shutting the auxiliary pump 120 off too early or late are a change in boom speed. Testing shows the auxiliary pump 120 needs to be deactivated within 50 milliseconds. Too late and the boom over speeds, too early and the boom movement lags.

The engine 20 will initialize shutdown upon two conditions—a load is not detected 124 in the working fluid and the predetermined engine run time has exceeded. If no load is detected, the engine 20 is shutdown with the goal of reducing idle time. If a load is detected 124 while the engine 20 is being deactivated, the controller is triggered by a percentage of the prior engine speed and detection of a pressure greater than the low state pressure created by the mechanical PTO. The auxiliary pump is activated and is responsible for full flow of the working fluid.

The percentage drop in RPM before the system responds is roughly 4%. The system needs to respond to roughly 5% change in low state pressure. This provides an adequate response for the pump to build the pressure and flow required.

Figure 2:
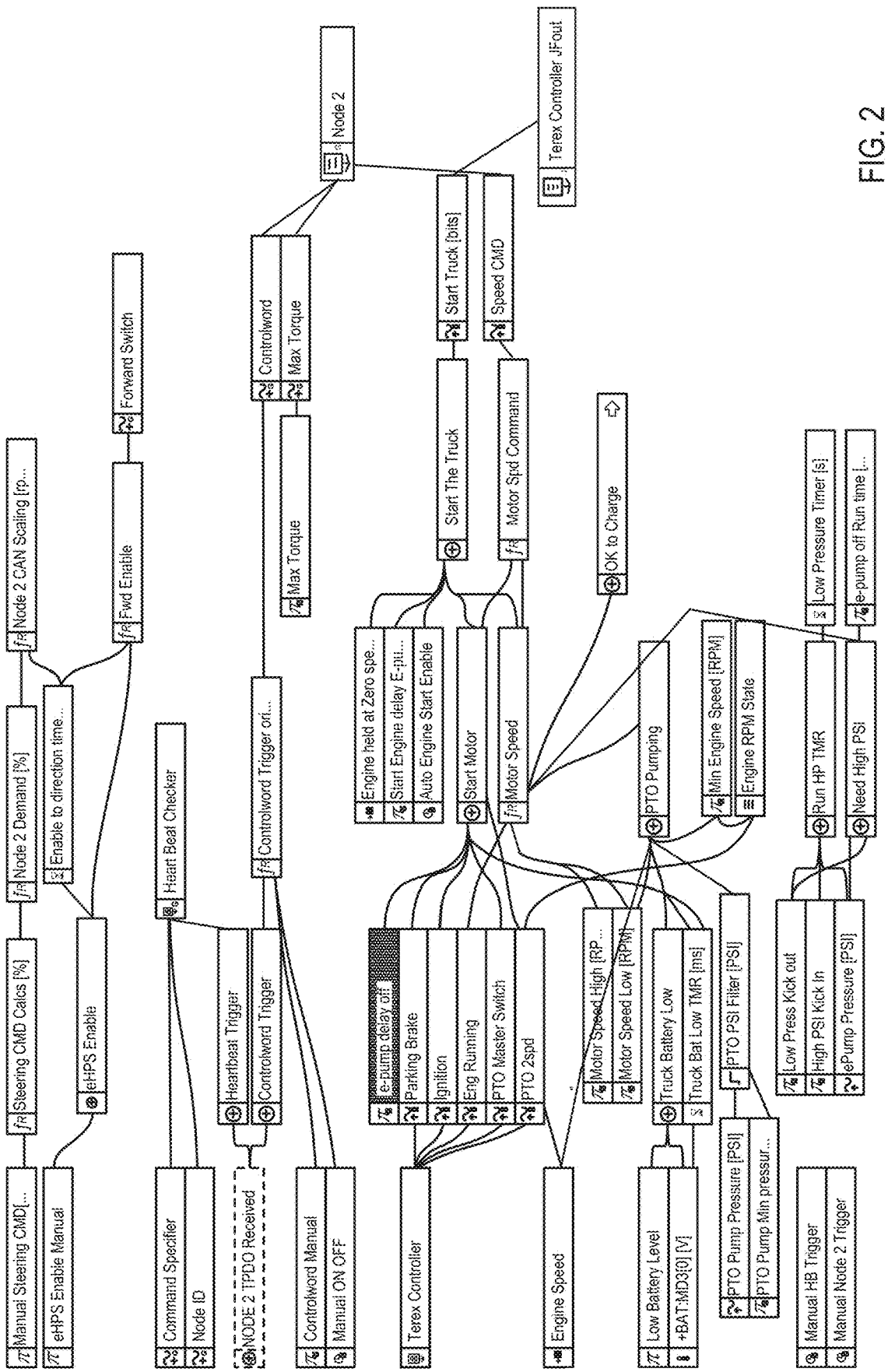
FIG. 2 is a simplified schematic diagram of a data communication relationship and operational logic configuration which could be used with a system as shown in FIG. 1.

Now referring to FIG. 2, there is shown detail relating to the standby and operational speeds of the electric motor (110). Based on PTO pump pressure (123) and ePump Pressure (121) will determine the state of the electric motor for motor speed low (110), motor speed high (110). If the motor speed (110) and ePump Pressure (121) meet the criteria, the truck engine will start (136) and the electric pump speed will change to "off" based on the PTO pump pressure (124). The truck engine can also be started (136) when the Ba:MD3[0] (162) falls below the low battery level (141).

Figure 3:
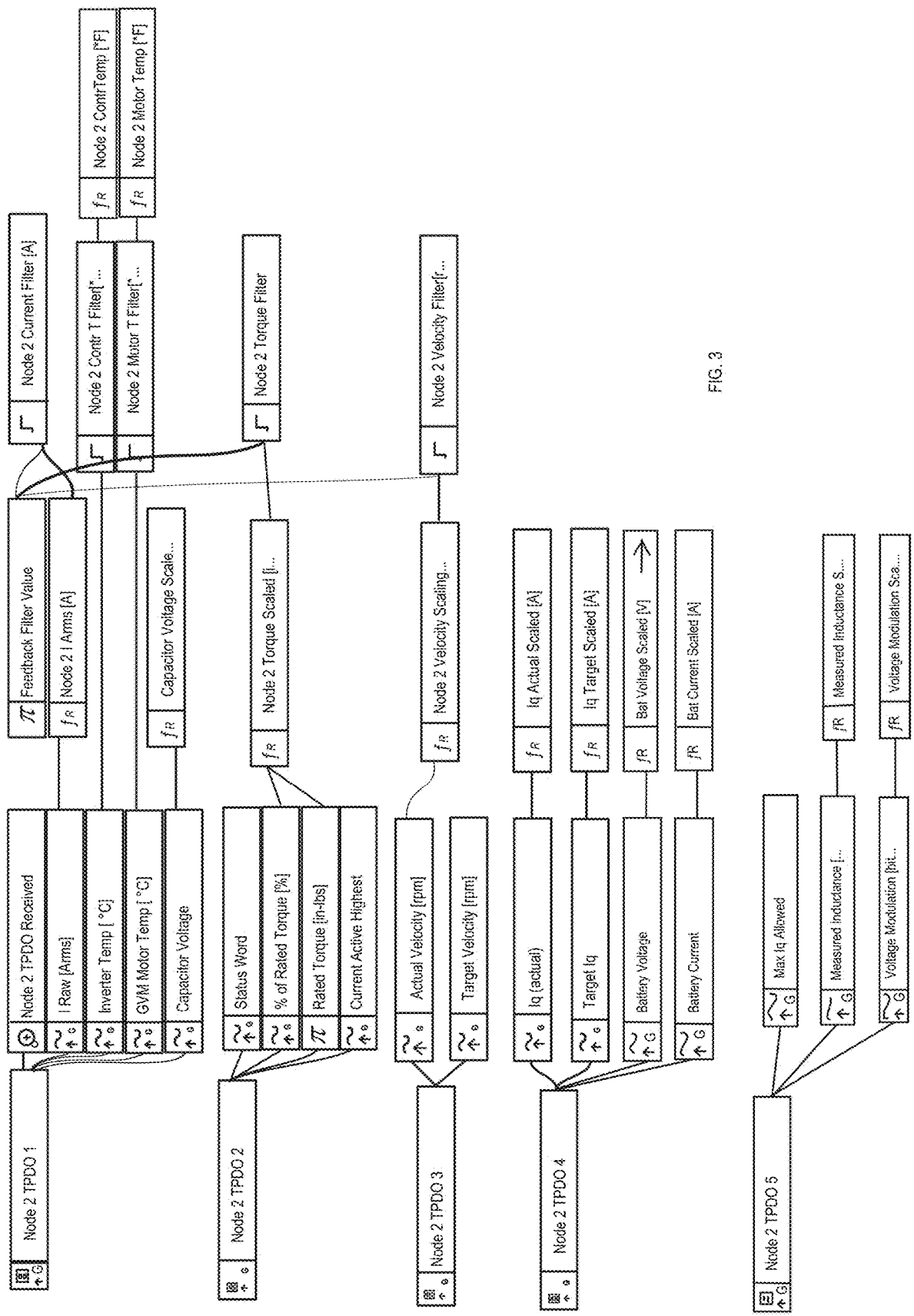
FIG. 3 is an additional depiction of an operational configuration of an embodiment of the present invention.

Now referring to FIG. 3, there is shown details relating to the charging rates of rated torque (110) and actual velocity (110) can be varied to change to the charging rate of the electric motor. Inverter temp (134) and battery voltage (162) are monitored to ensure safe charging conditions.

Figure 4:
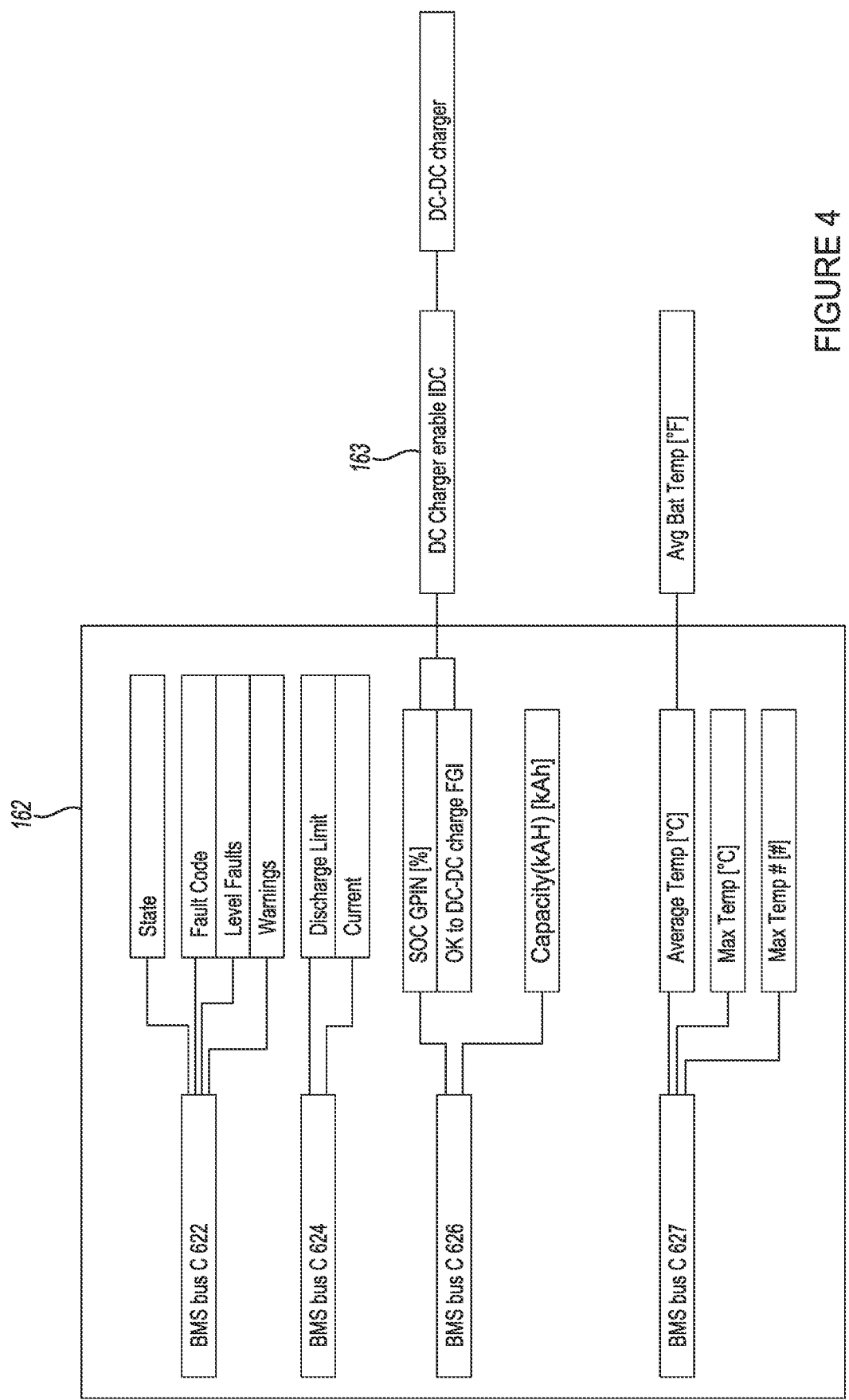
FIG. 4 is an additional depiction of an operational configuration of an embodiment of the present invention which relates to temperature of a battery during a charging process.

Now referring to FIG. 4, there is shown a representation of factors involved in regulating charging of a battery based upon temperature of that battery.

Figure 5:
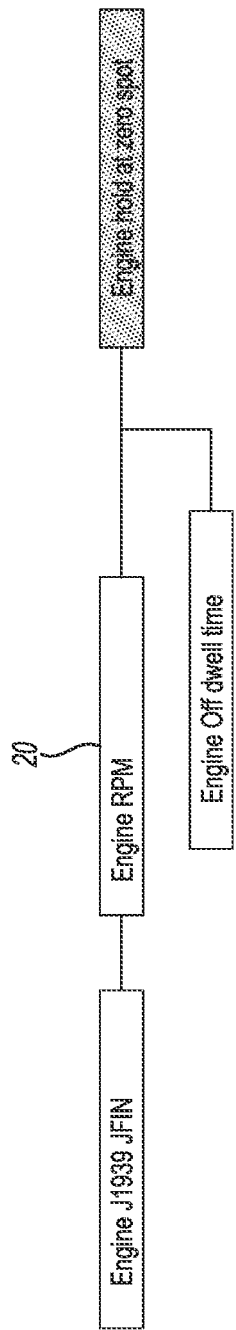
FIG. 5 is an additional depiction of an operational configuration of an embodiment of the present invention relating to control of restarting after a shutdown.

Now referring to FIG. 5, there is shown a representation of factors including dwell time involved in controlling restarting the engine after a shut down.

During times that the engine 20 is off, the auxiliary battery controllers 130 and 134 drive the electric motor 110 which has mechanical connection to BOTH the auxiliary hydraulic pump 120 and the hydraulic motor 100, which the three in combination can be viewed as a tandem hydraulic pump 125. This eliminates the need for a separate electric motor for auxiliary hydraulics and auxiliary air conditioning. An air conditioning compressor clutch 150 which couples the mechanical rotary power being supplied to the air conditioning compressor 11 from the normal belt 24 in the vehicle air conditioning system to the belt 151 and pulley driven alternately by the electric motor 110.

This configuration allows for operation of the air conditioning system without the need for changing anything in the vehicle air conditioning refrigerant system including items 11-16.

Figure 6:
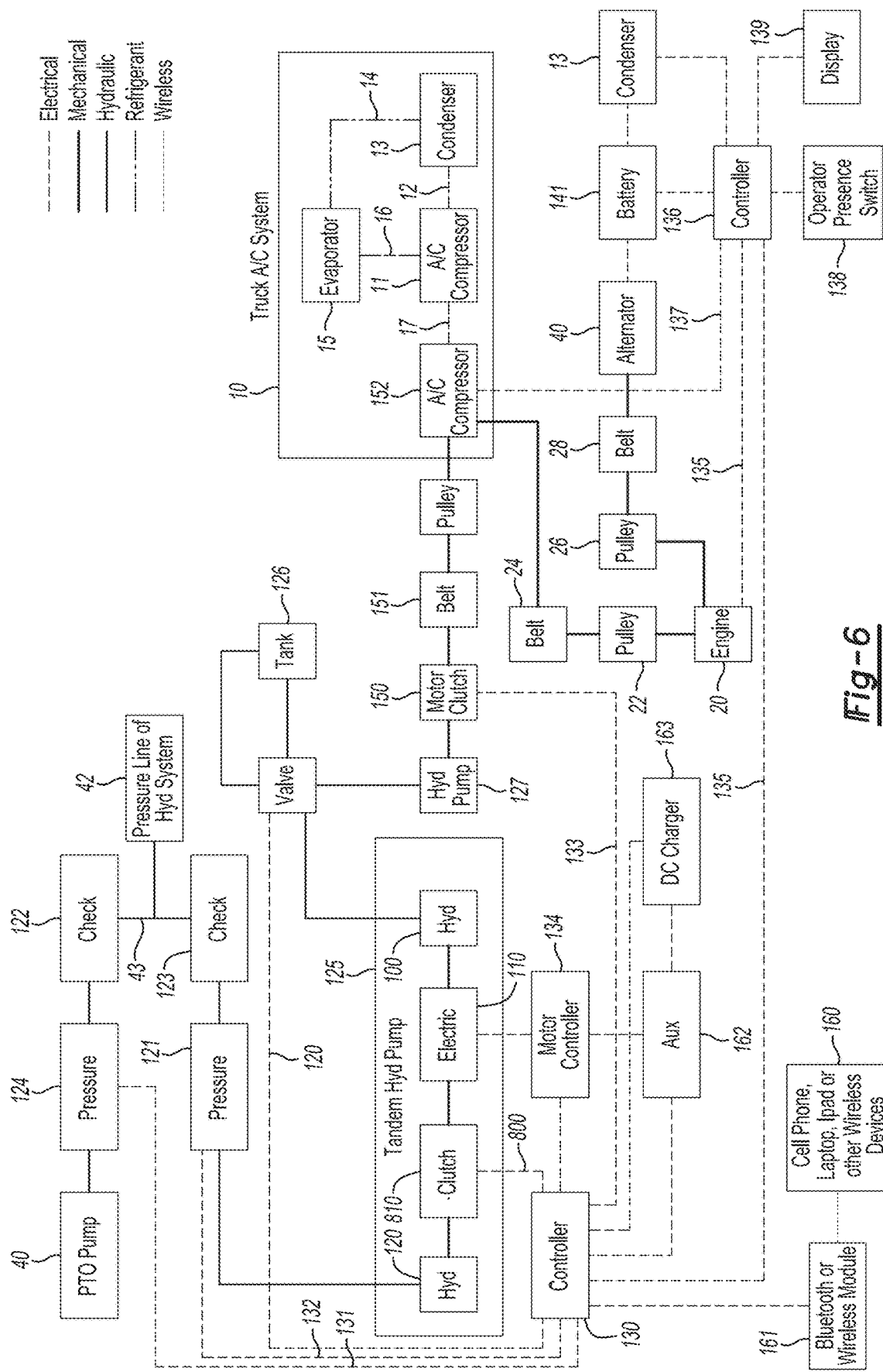
FIG. 6 is a schematic representation of an alternate rapid recharging embodiment of the present invention.

Now referring to FIG. 6, there is shown an alternate version of the present invention which provides for the ability to charge and/or increase the rate of charging the auxiliary battery 162 without using capacity from the alternator 40 and/or without the need to add an additional alternator. Instead, the electric motor 110 is driven backwards to generate a DC charging current to the auxiliary battery 162.

The electric motor 110 is driven backward when the vehicle engine 20 is running and the air conditioning compressor 17 is turning and the motor clutch 150 is engaged causing the hydraulic motor/pump 127 to turn. A valve 820 is included between the existing tank 126 and the hydraulic pump 127, when closed the valve 820 blocks flow in one direction while permitting flow in the opposite direction. When the valve 820 is open, fluid is free to move in either direction.

The hydraulic pump 100 would be caused to turn in an opposite direction from the direction it turns when the auxiliary battery 162 is used to turn the air conditioning compressor 17. The hydraulic motor 100 then turns the electric motor 110 and provides power for charging the auxiliary battery 162.

Figure 7:
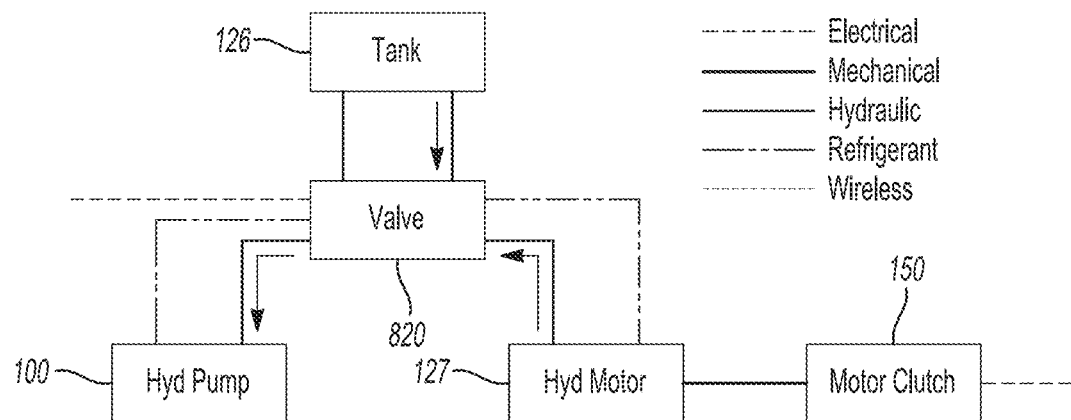
FIG. 7 is a schematic representation of a portion of the present invention shown in FIG. 6 but with a first fluid flow path.
Figure 8:
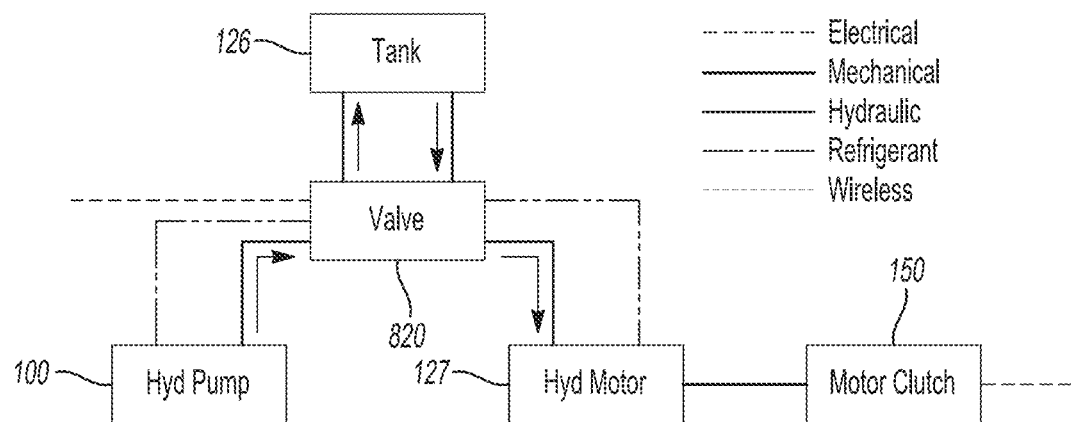
FIG. 8 is a schematic representation of the same portion as shown in FIG. 7 but with a second fluid flow path.

FIGS. 7 and 8 show the direction of flow around the fluid path defined by the pump 127, hydraulic motor 100 and valve 820. When the valve 820 is closed, (FIG. 8) the direction of flow reverses and the hydraulic motor 100 is turned in reverse. In FIG. 6, there is shown a clutch 810 between the electric motor 110 and the hydraulic pump 120 which, in normal operation of the idle management system is used to provide an alternate source of hydraulic pressure for the PTO system of the vehicle during engine off times. An electronic control line 800 to the clutch 810 switches (on and off) the connection between the electric motor 110 and the hydraulic pump 120. Also shown is an electronic control line from control 130 to valve 820.

The result is that without the need for another alternator, the auxiliary battery is charged at a much higher rate than in the original system of FIG. 1. The DC charger 163 and the connection to the alternator 40 could be left in place or removed.

Figure 9:
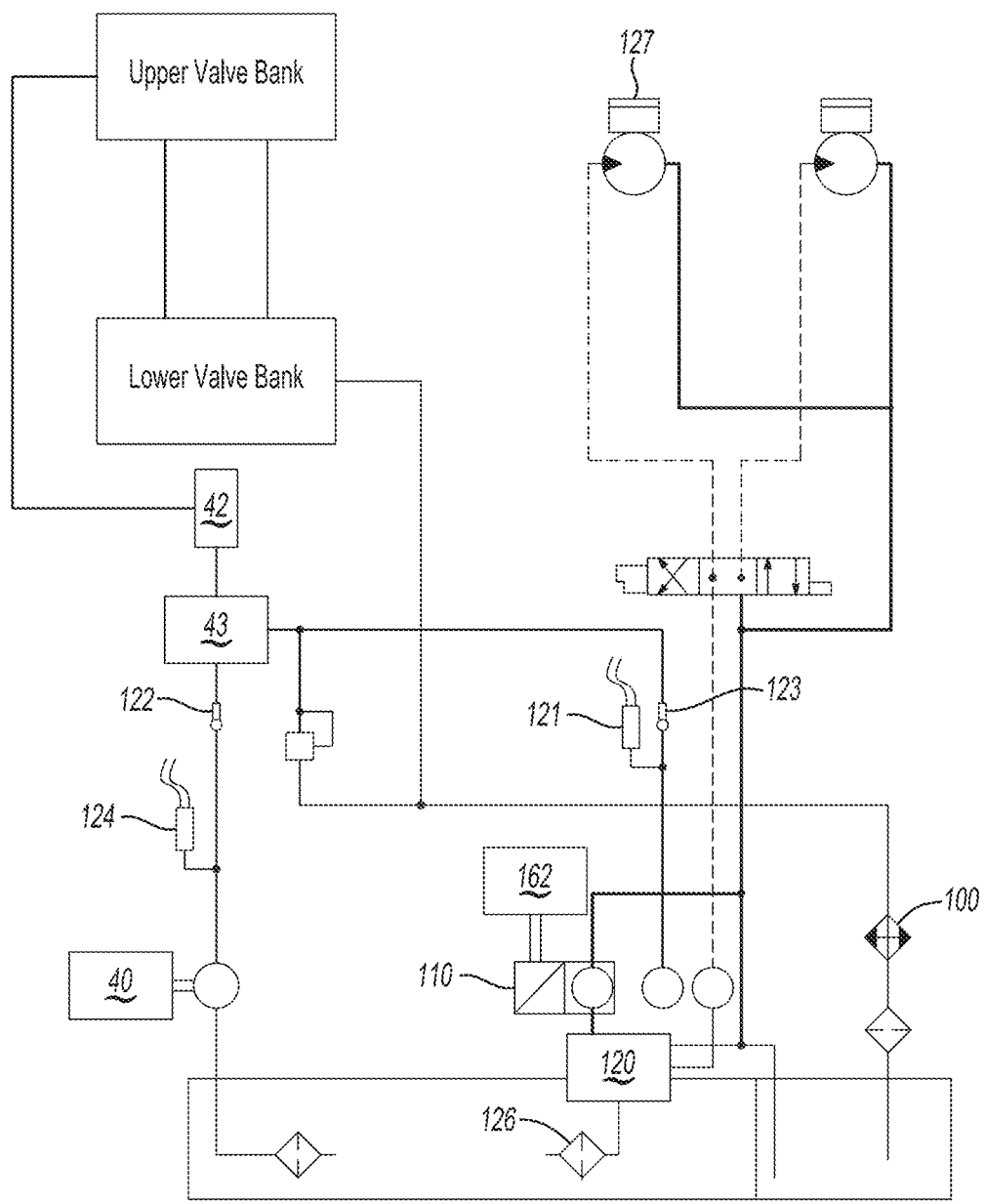
FIG. 9 is a more detailed schematic representation of hydraulic portions of the present invention.
Figure 10:
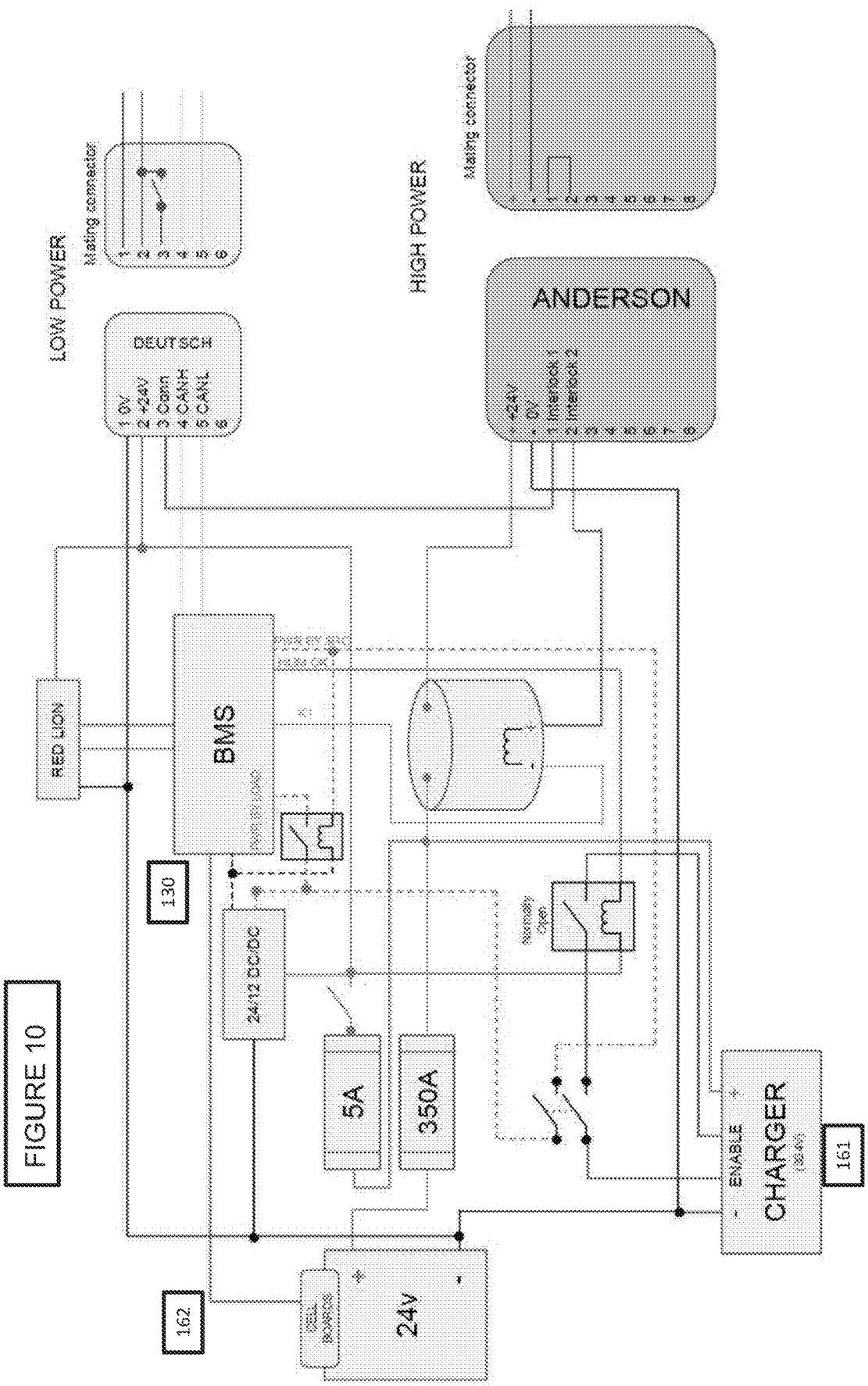
FIG. 10 is a detailed schematic view of a battery management system of the present invention, which provides information including safety information for a particular embodiment of the present invention.

FIGS. 9 and 10 are included to provide more specific details of a particular embodiment of the invention as mentioned above.

Figure 11:
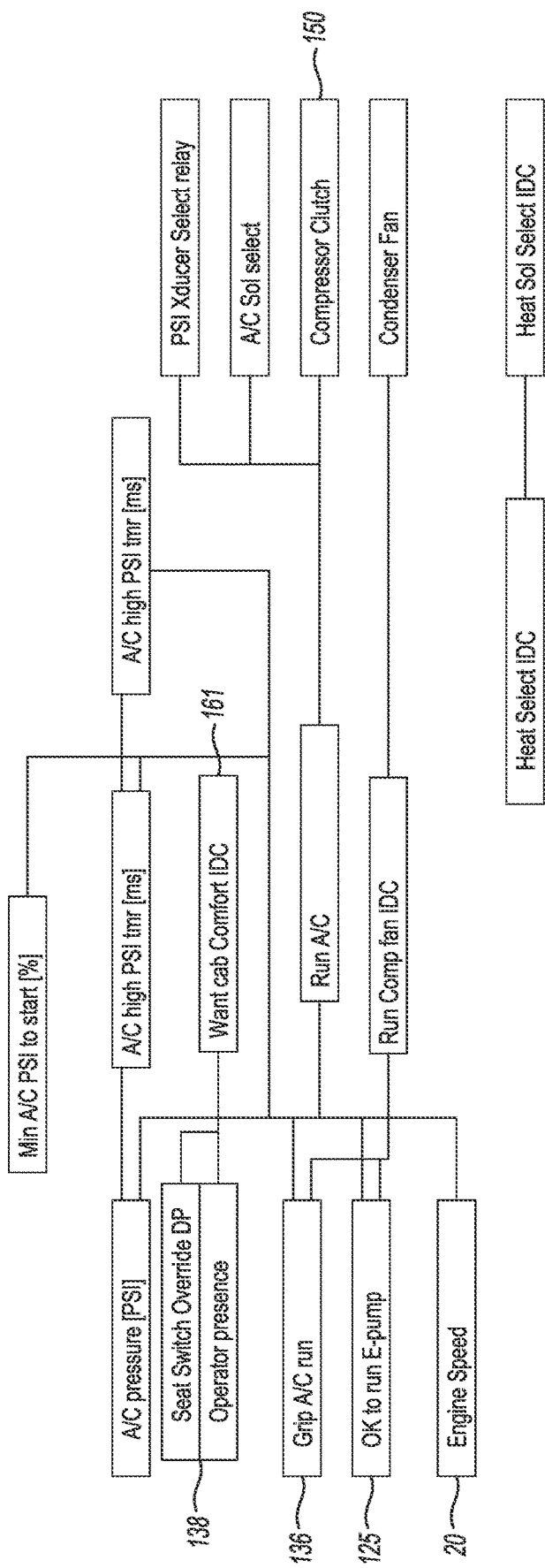
FIG. 11 is a detailed schematic representation which relates to desired cab temperatures based upon operator presence in the cab.

Now referring to FIG. 11, there is shown a detailed representation showing that the auxiliary air conditioning system can be turned on based on items 161, 150, 136, 125 and 20. Item 138 will vary the desired temperature setting based on the operator presence in the cab, bucket or in a certain proximity to the machine. Using this setting, difference in cab temperatures can be adjusted to achieve the maximum operator satisfaction versus energy consumed to cool the cab.

Figure 12A:
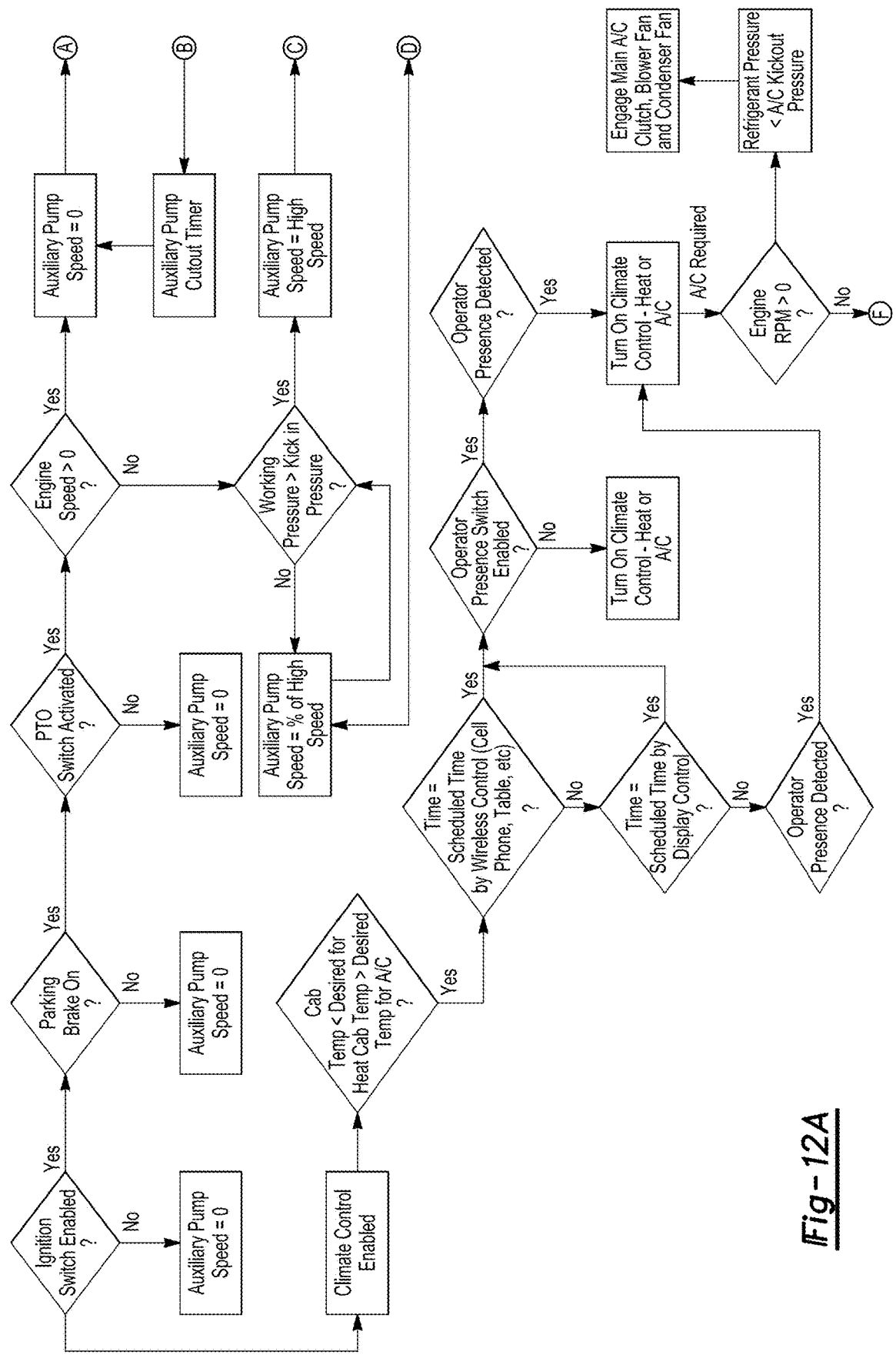
FIG. 12 is a spatial representation of the proper orientations of FIGS. 12A-12C which are in combination an overall decision matrix on how the present invention could be made to operate.
Figure 12B:
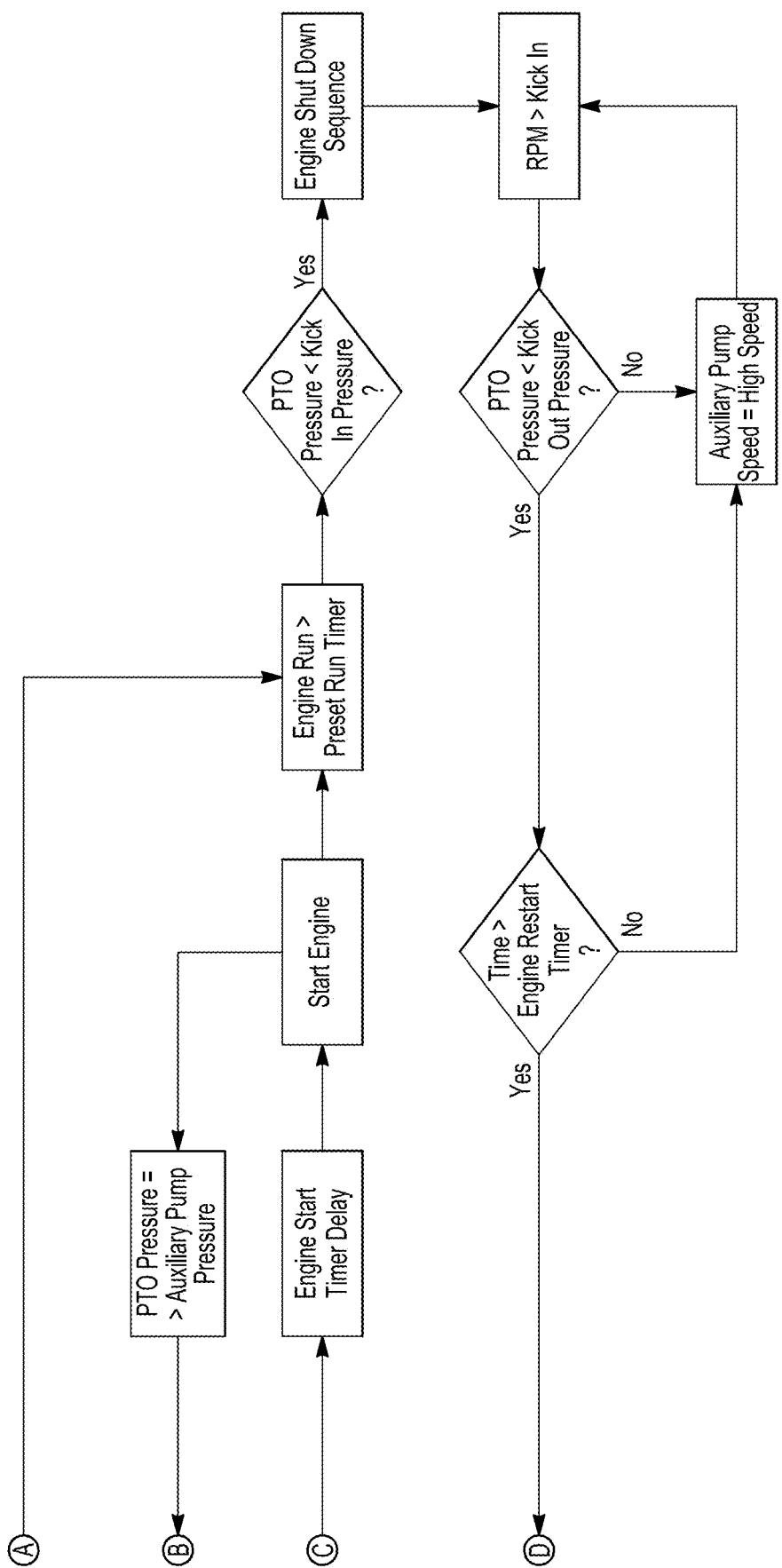
Figure 12C:
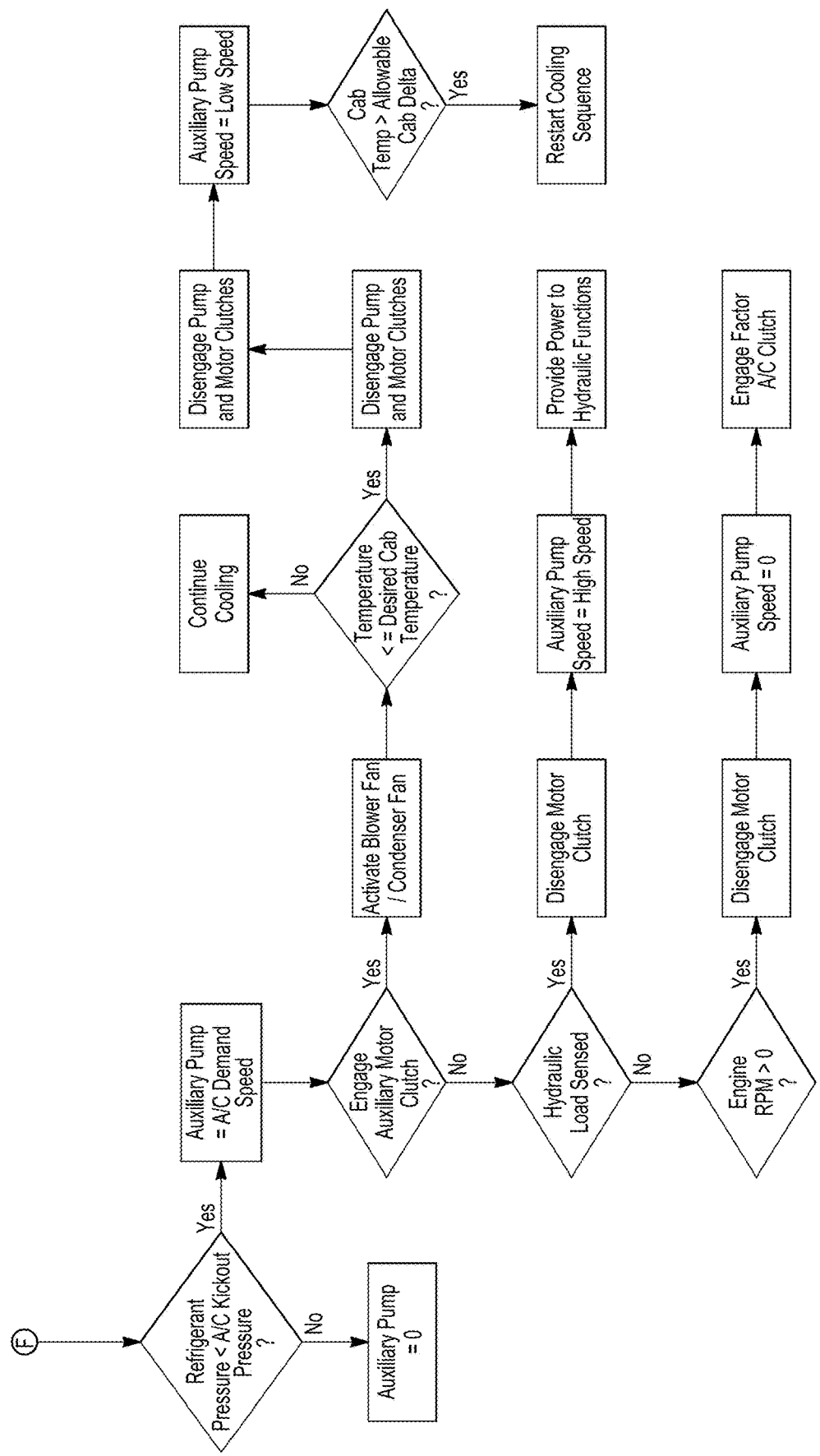

Now referring to FIG. 12, there is shown a spatial representation of the proper orientations of FIGS. 12A-12C, which are in combination an overall decision matrix on how the present invention could be made to operate.

Figure 13:
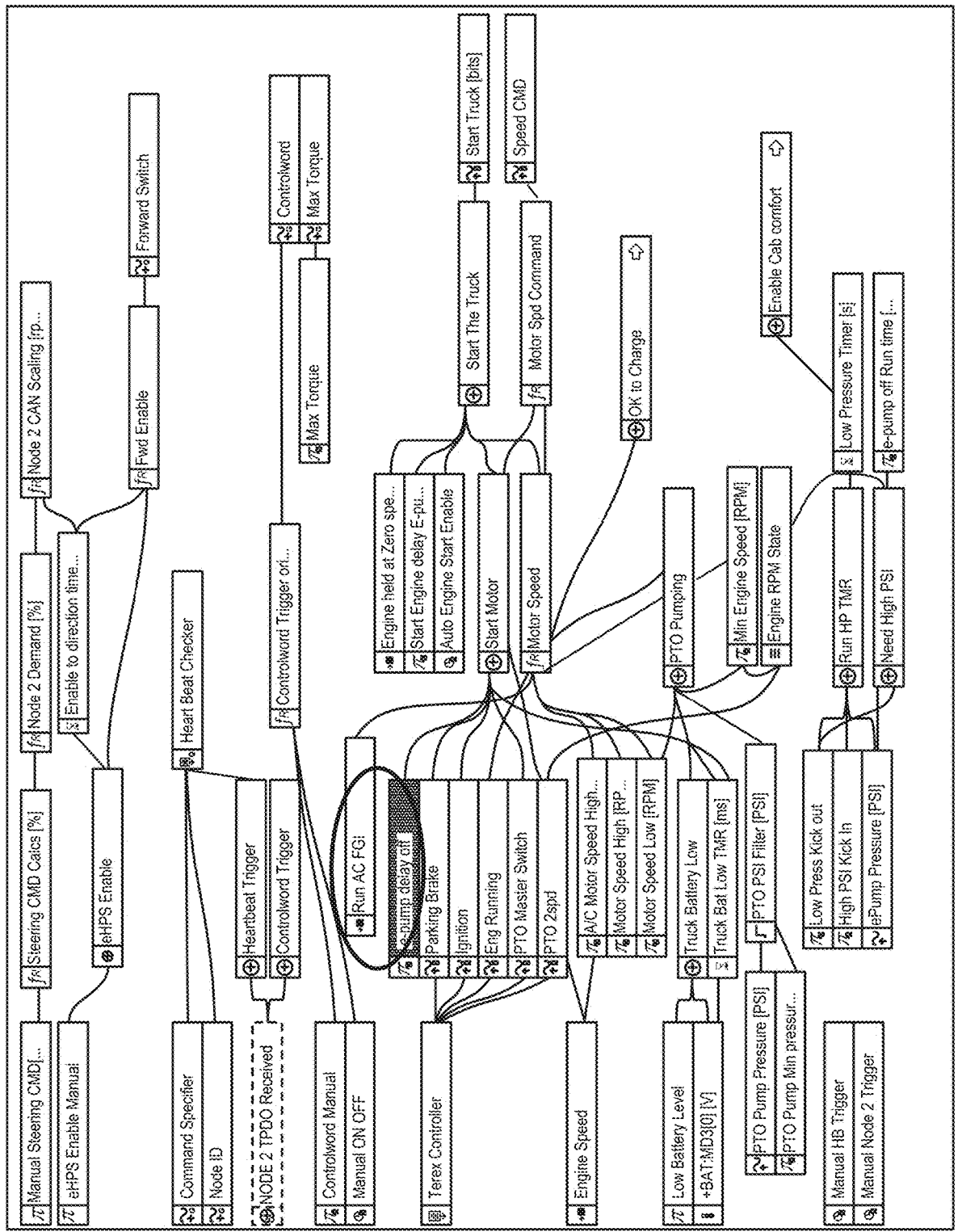
FIGS. 13-38 are schematic representations of operation parameters of the present invention.

Now referring to FIG. 13, there is shown a schematic representation of details relating to how "E-pump delay off" is used to determine when the electric motor needs to shut down. This parameter is needed to keep constant motion on the bucket to not over or under speed the boom since the total flow to the boom is a combination of the PTO pump and electric motor/pump output.

Figure 14:
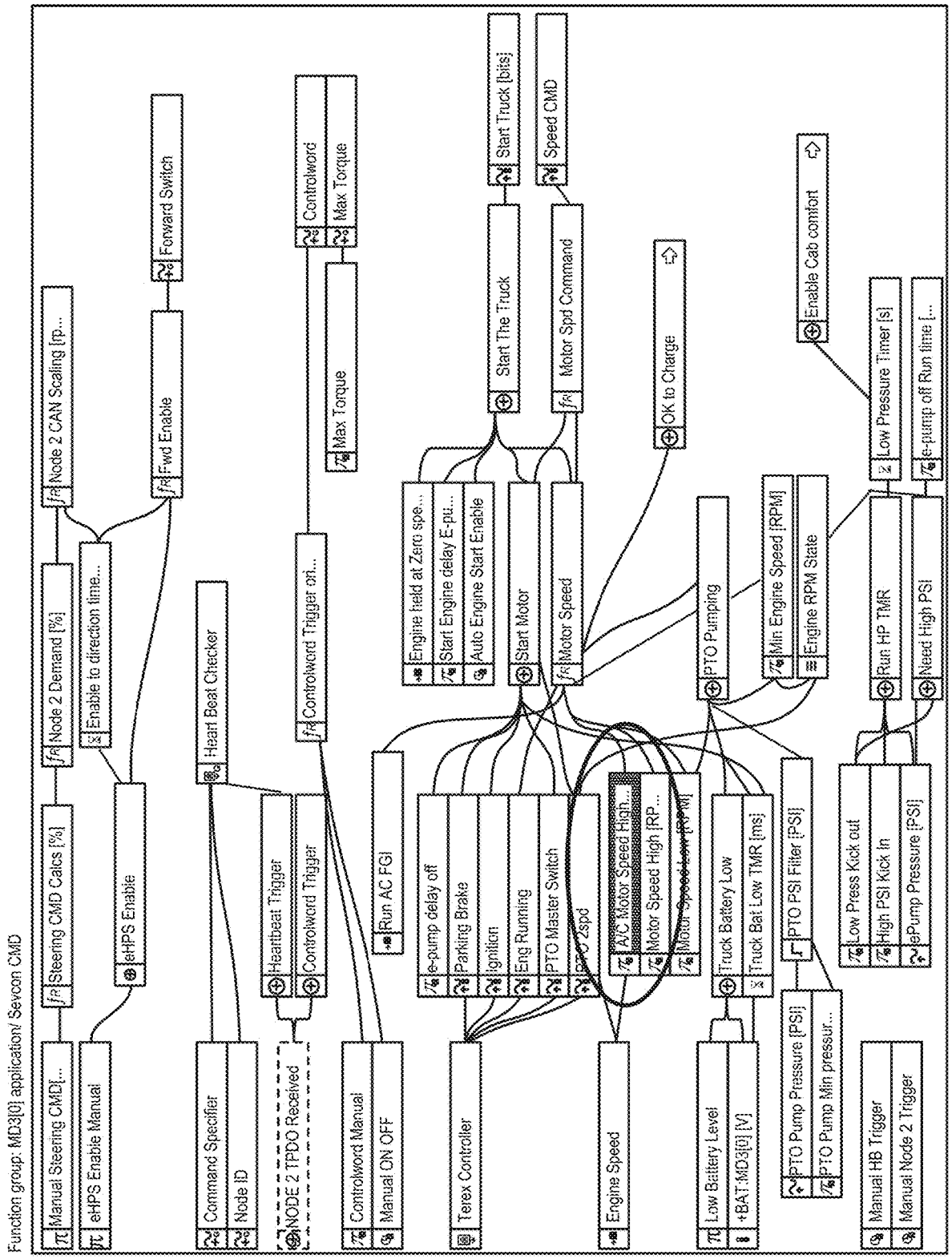

Now referring to FIG. 14, there is shown a schematic representation of details relating to how "Air Conditioning Motor Speed High" is used to determine the operational condition of the electric motor to match the desired compressor speed used to cool the cab. This parameter is updated in real time to maximize the overall cooling performance while minimizing the energy consumed.

Figure 15:
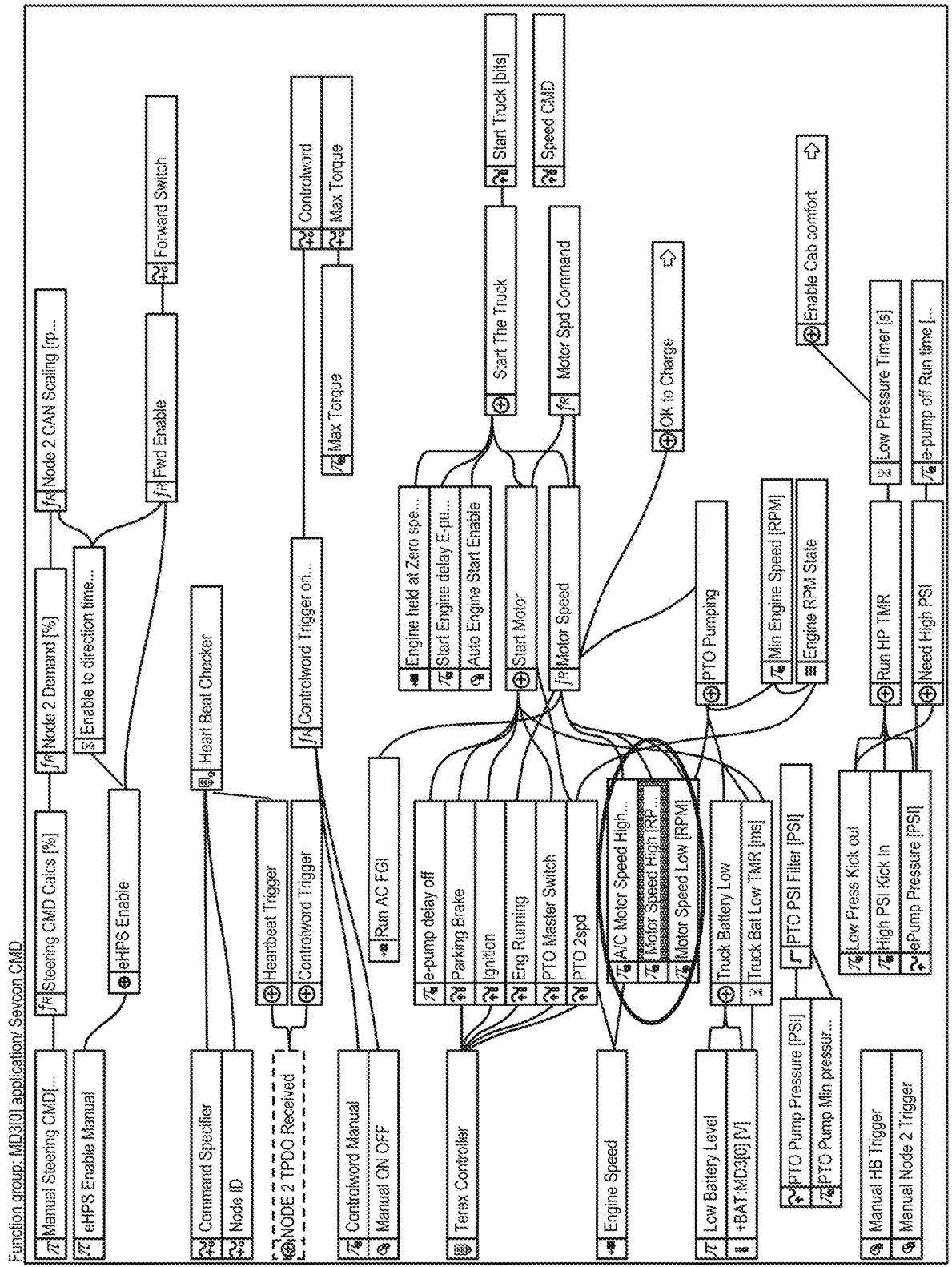

Now referring to FIG. 15, there is shown a schematic representation of details relating to how "Motor Speed High" is used to achieve the desired output of the electric pump to match the boom performance of the PTO pump.

Figure 16:
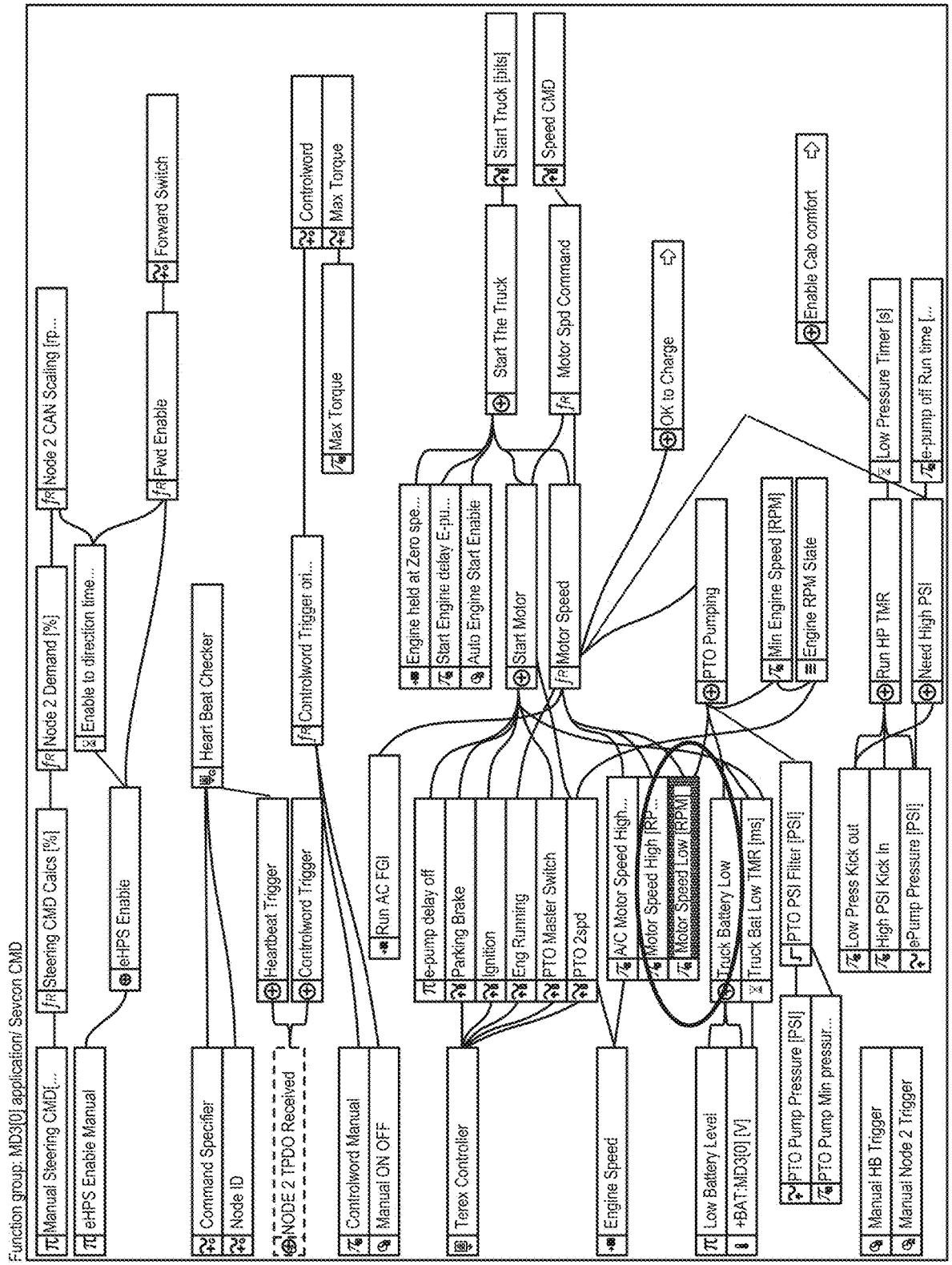

Now referring to FIG. 16, there is shown a schematic representation of details relating to how "Motor Speed Low" is used to determine the standby speed to minimize the power consumption when the boom is not in use. This speed must allow the pump to build pressure to ensure no noticeable lag to the operator when boom functionality is required.

Figure 17:
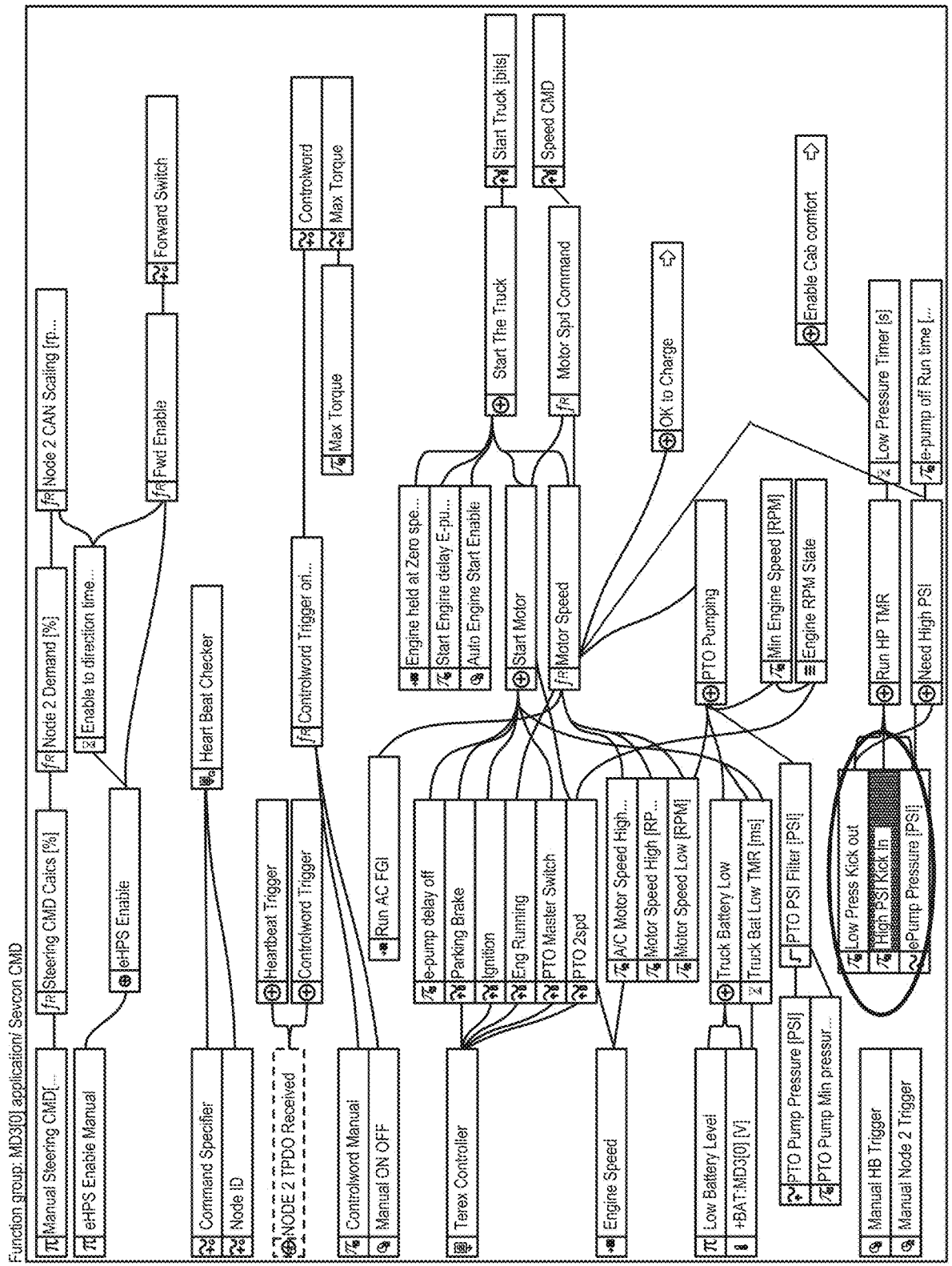

Now referring to FIG. 17, there is shown a schematic representation of details relating to how "High PSI kick in" is used and that when boom operation is required, this parameter sets the requirement for when the electric pump needs to be at operational speeds.

Figure 18:
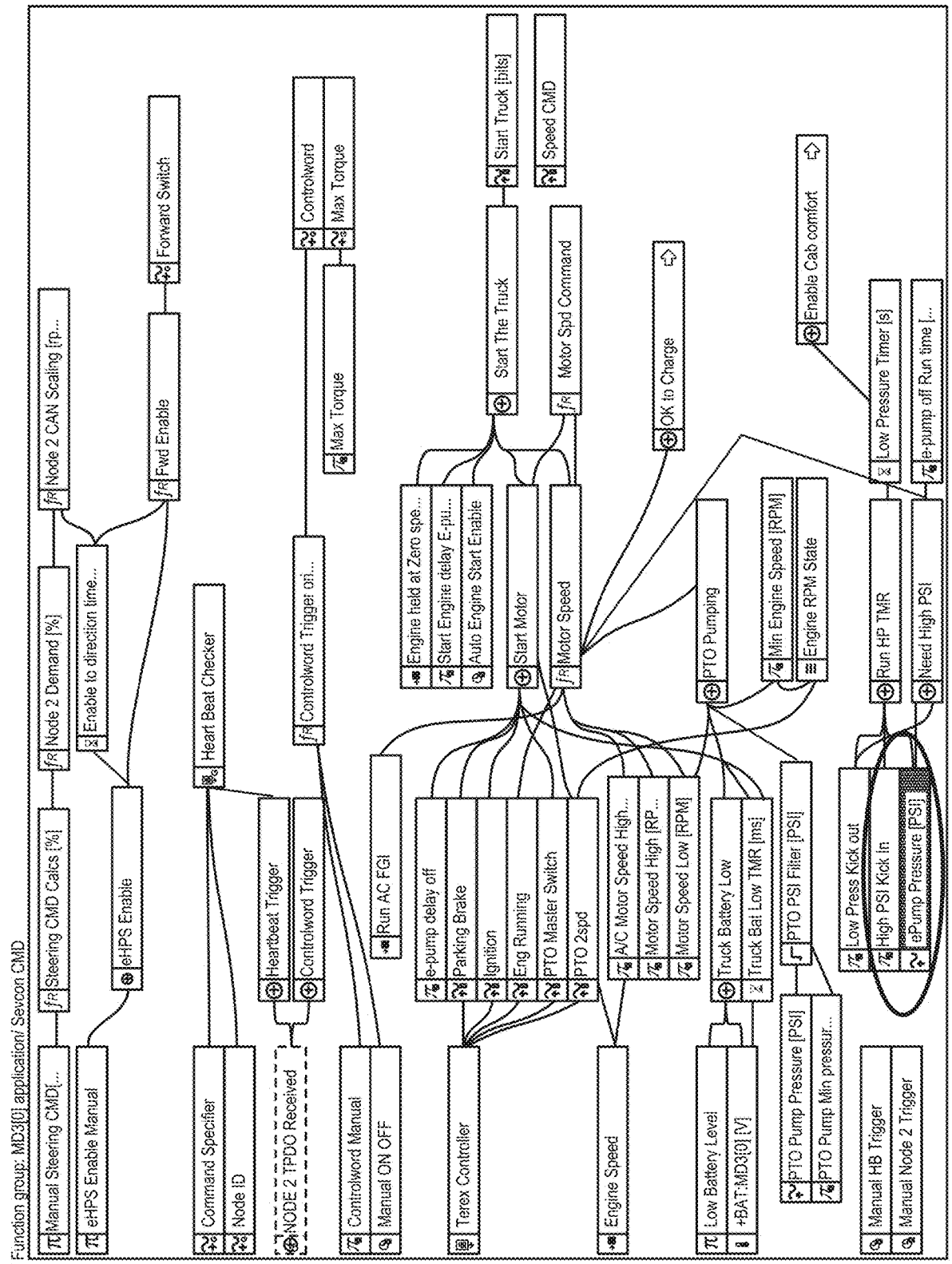

Now referring to FIG. 18, there is shown a schematic representation of details relating to actively monitoring the pressure output of the electric motor.

Figure 19:
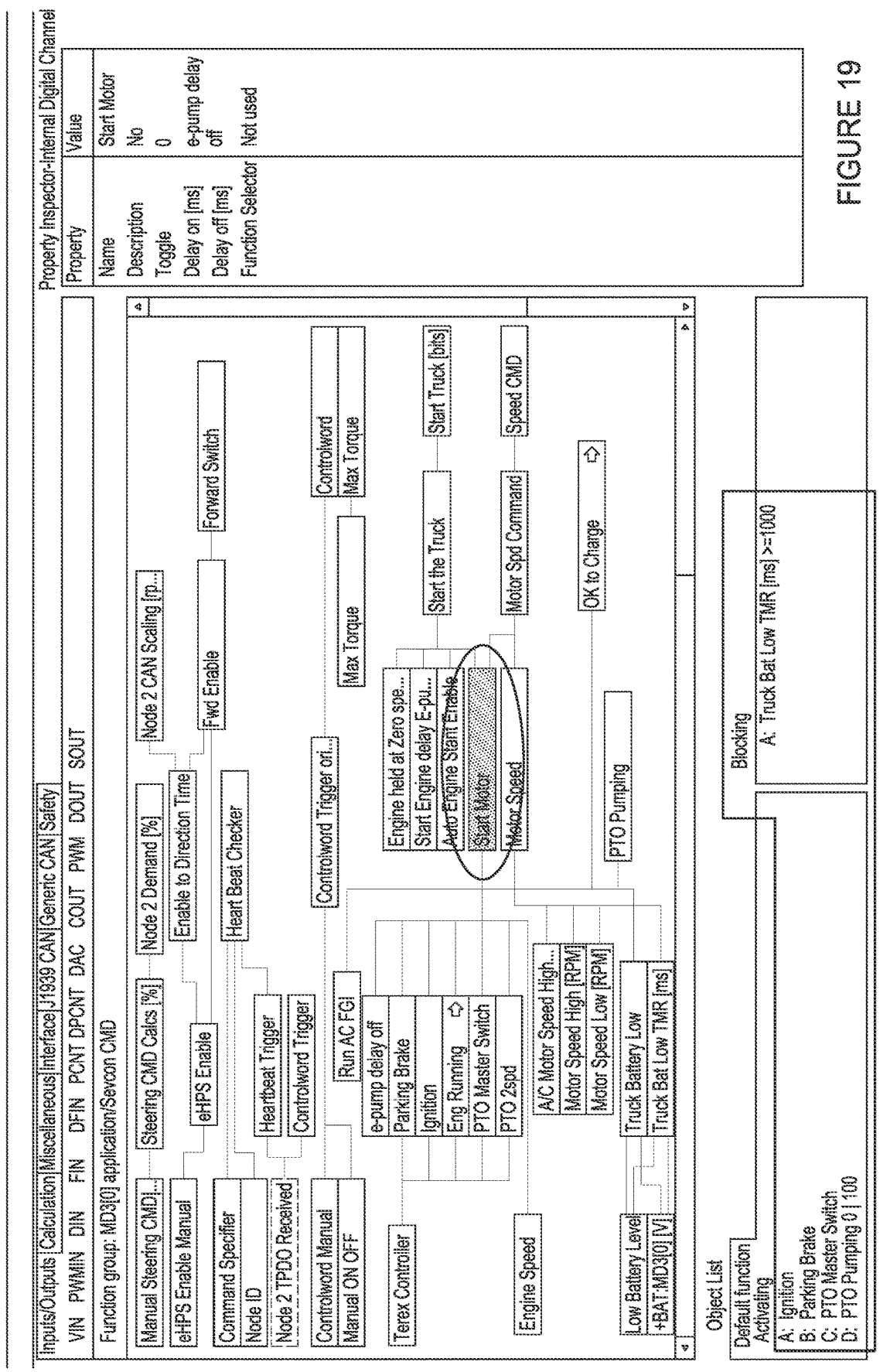

Now referring to FIG. 19, there is shown a schematic representation of details relating to how "Start Motor" uses various inputs to determine when the auxiliary air conditioning or hybrid boom operation is required. This parameter also sets the condition when the motor should be shutdown.

Figure 20:
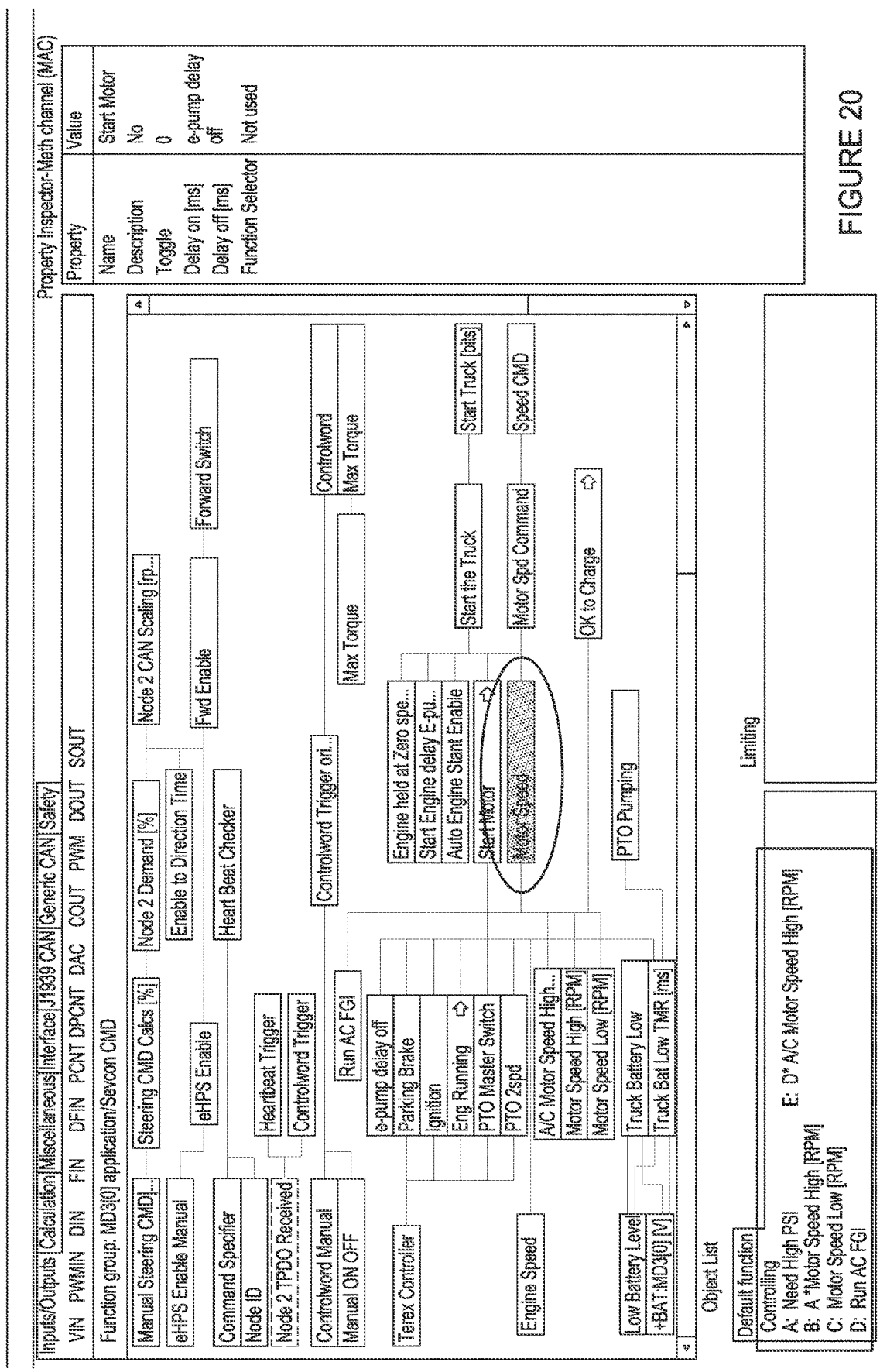

Now referring to FIG. 20, there is shown a schematic representation of details relating to how "Motor Speed" is taking various input to determine if the operation or standby motor condition is required by the electric motor.

Figure 21:
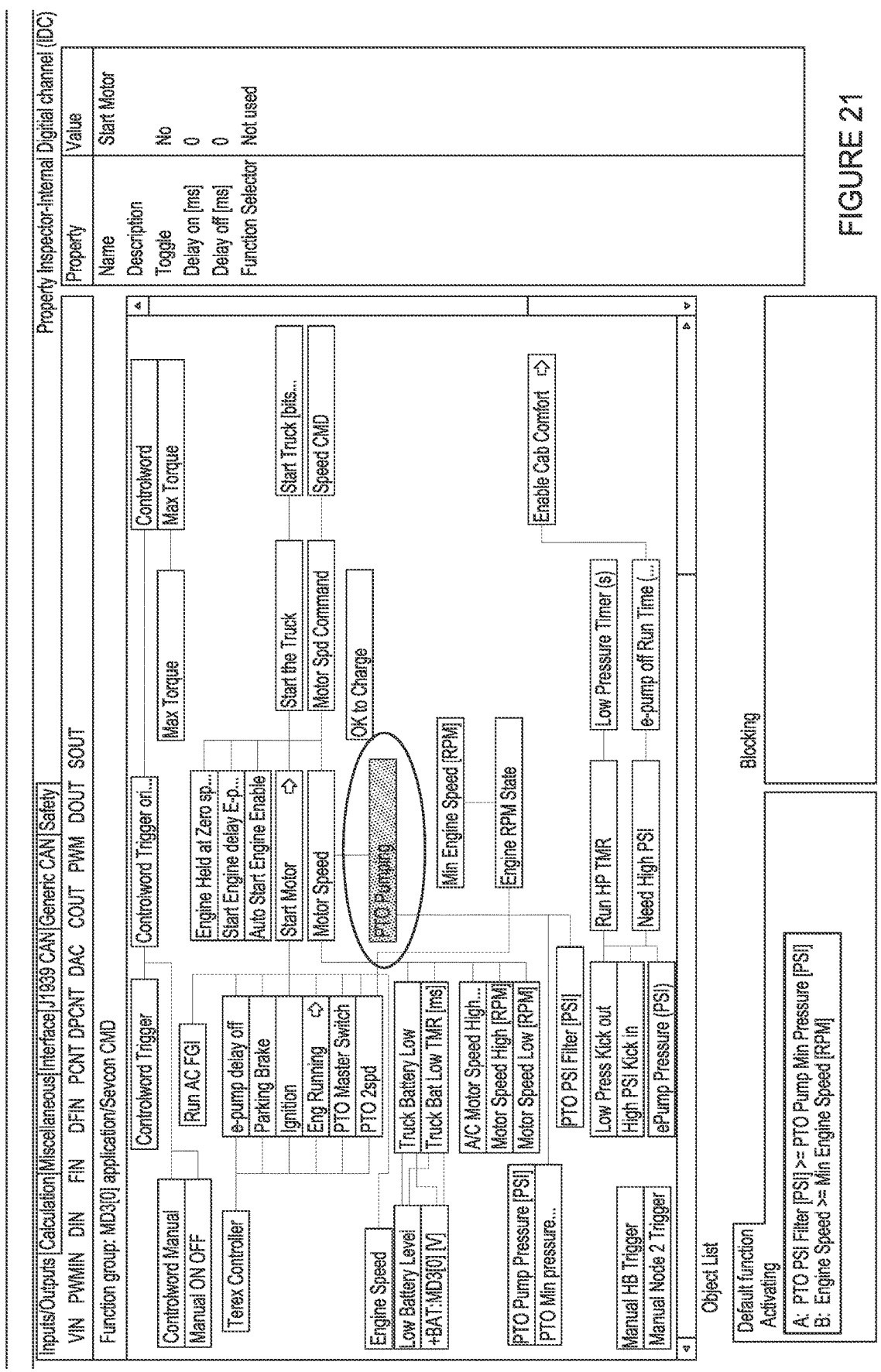

Now referring to FIG. 21, there is shown a schematic representation of details relating to how "PTO Pump" is used to determine the conditions when the PTO pump is fully active and leading to the ability to shut down or start up the electric motor.

Figure 22:
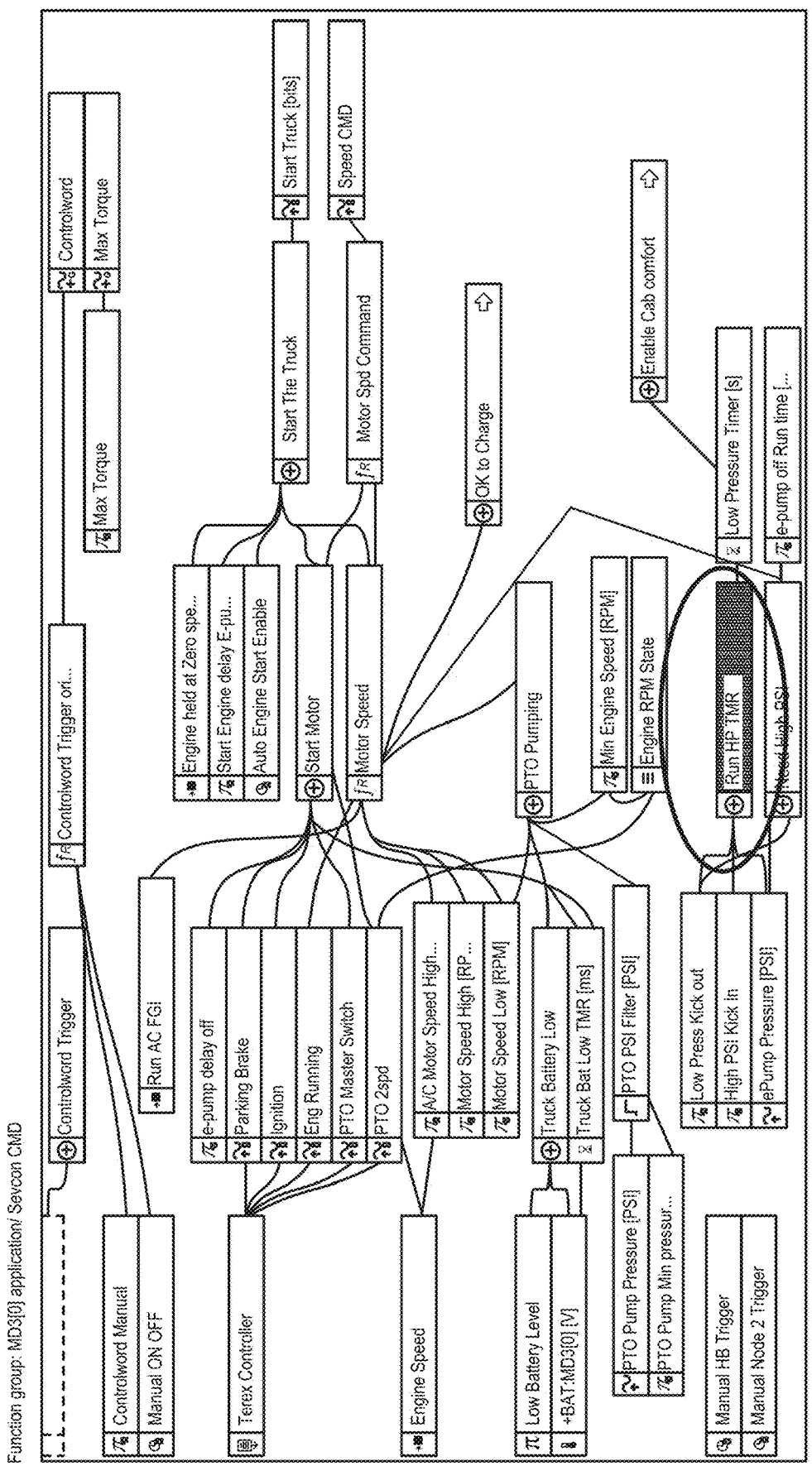

Now referring to FIG. 22, there is shown a schematic representation of details relating to how "Run HP TMR" sets the requirement of how long the pressure signal needs to be high before the system will respond, it also sets the requirement of when high pressure conditions should be ignored.

Figure 23:
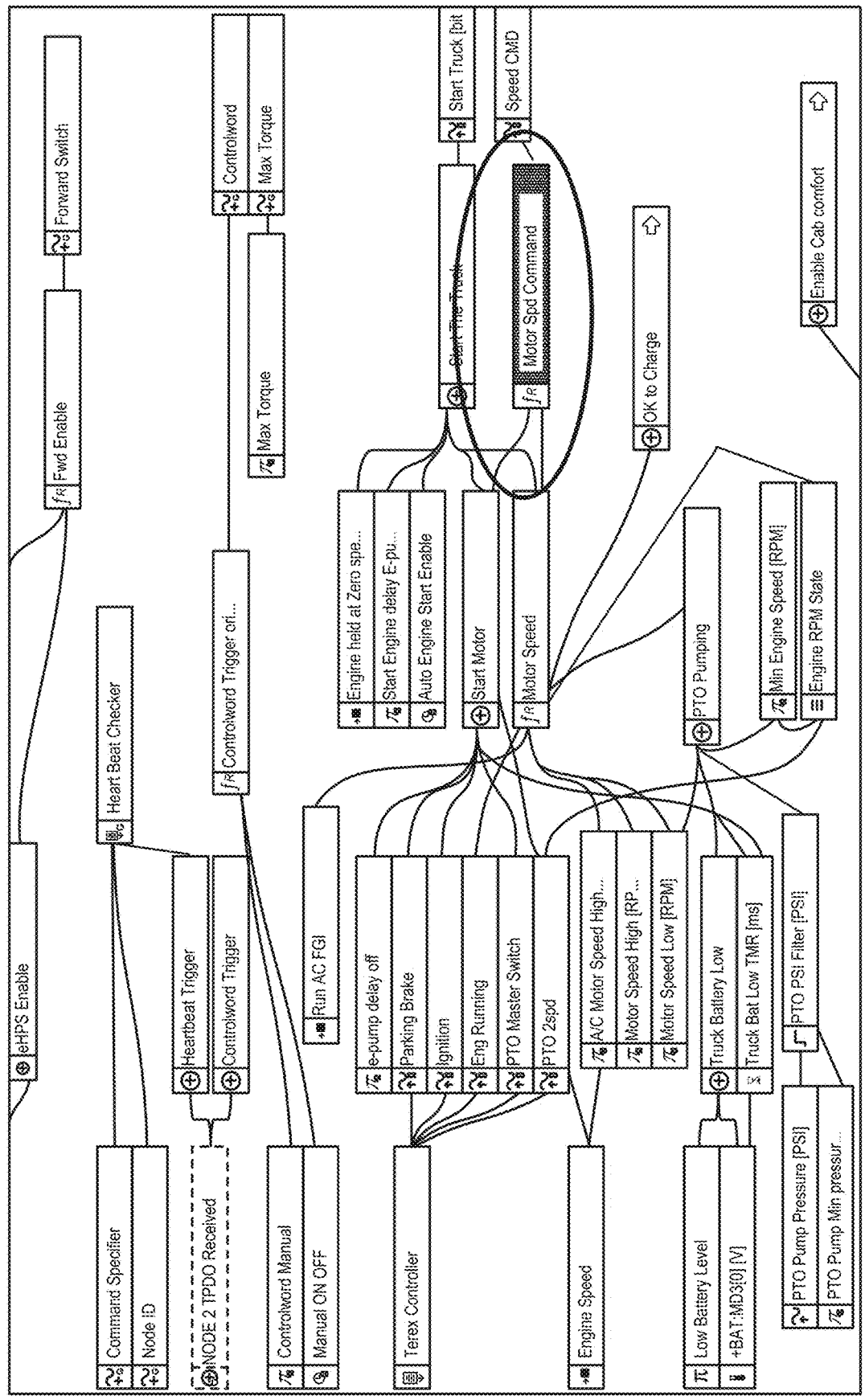

Now referring to FIG. 23, there is shown a schematic representation of details relating to how "Motor Speed Command" is used to determine the appropriate "Speed Command" of the electric motor.

Figure 24:
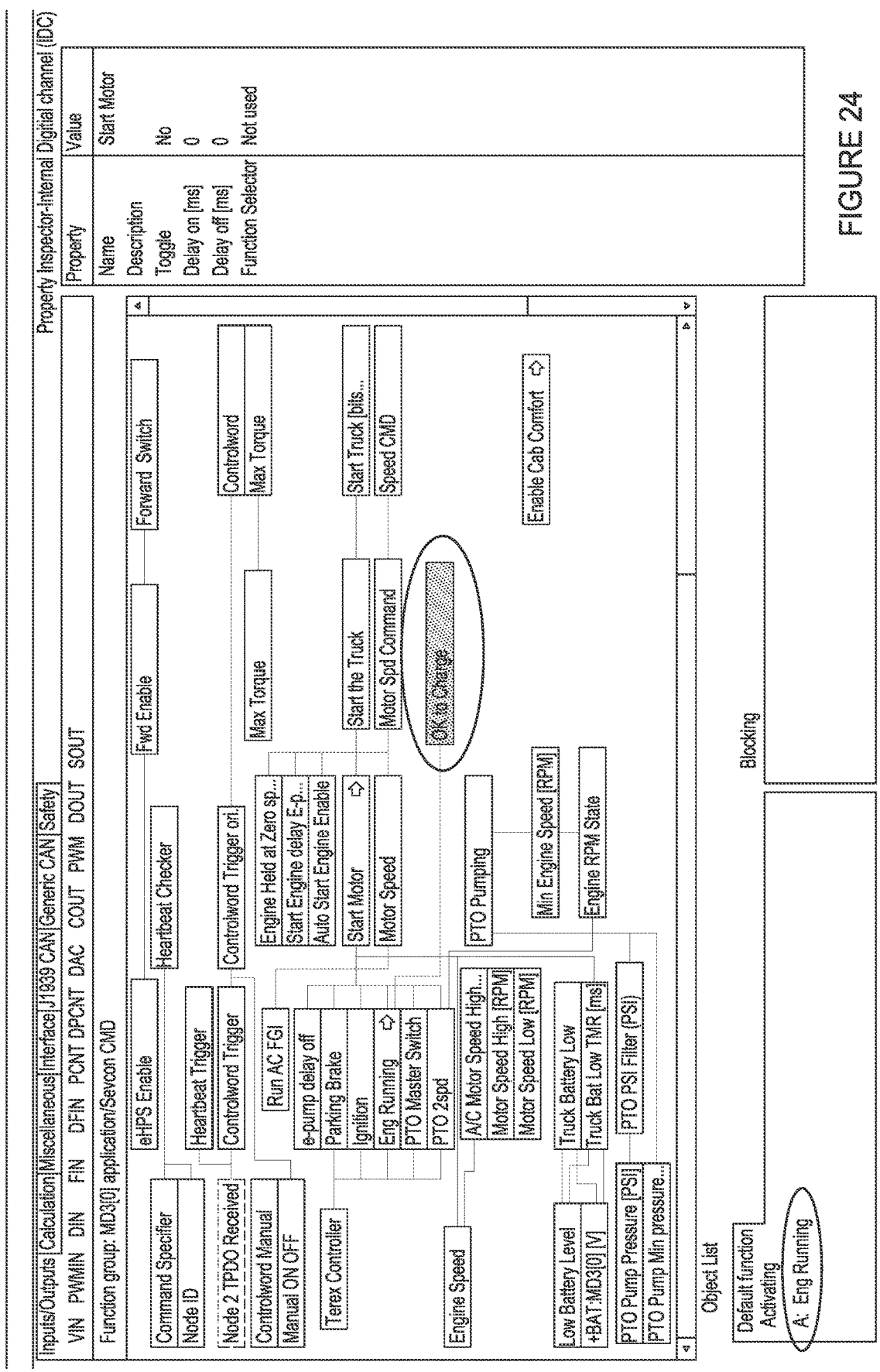

Now referring to FIG. 24, there is shown a schematic representation of details relating to how "Ok to Charge" is using inputs to determine if the system is in an acceptable condition to activate charging.

Figure 25:
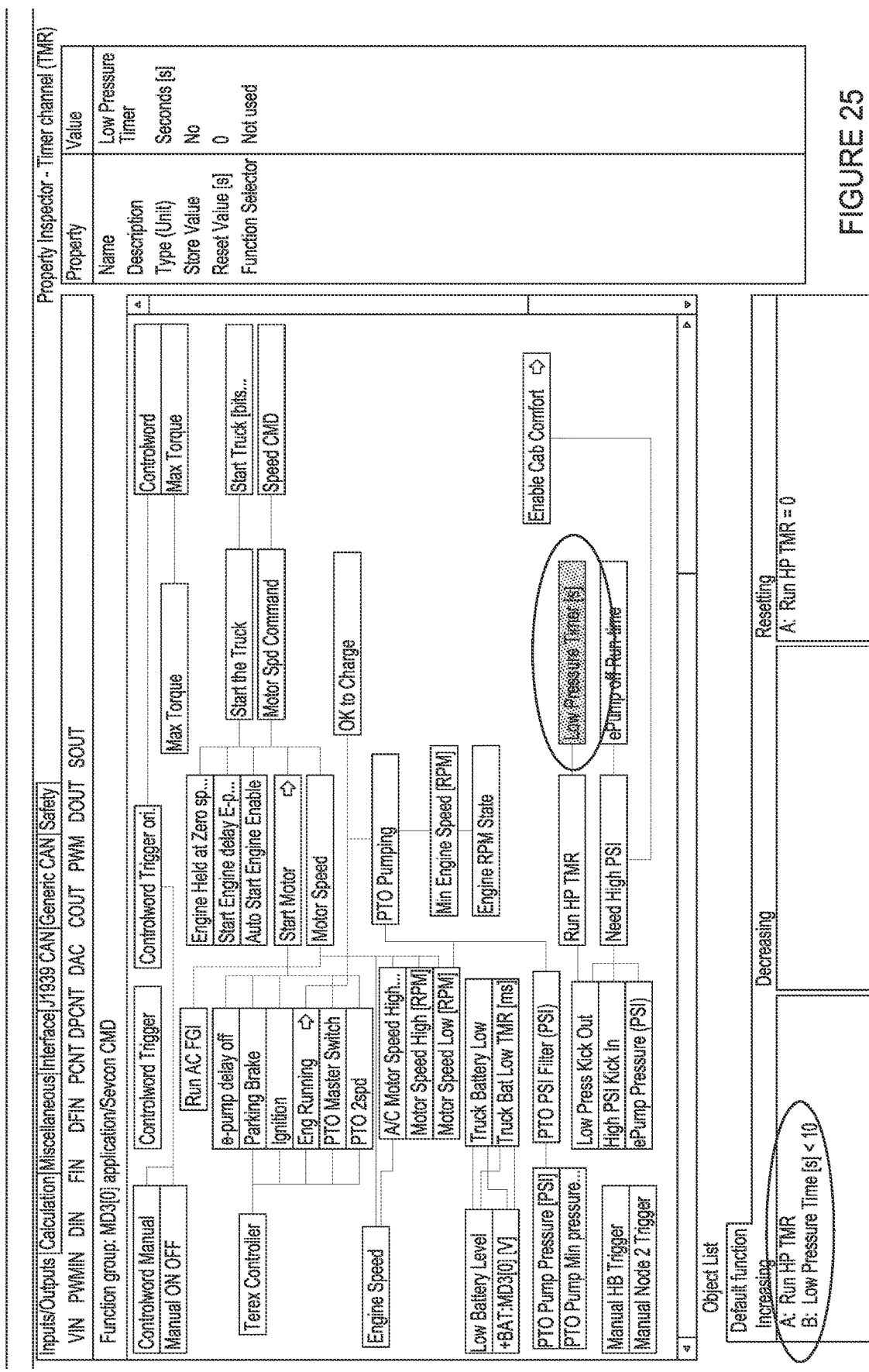

Now referring to FIG. 25, there is shown a schematic representation of details relating to how "Low Pressure Timer" is used to determine the required time the system needs to see low pressure before it responds.

Figure 26:
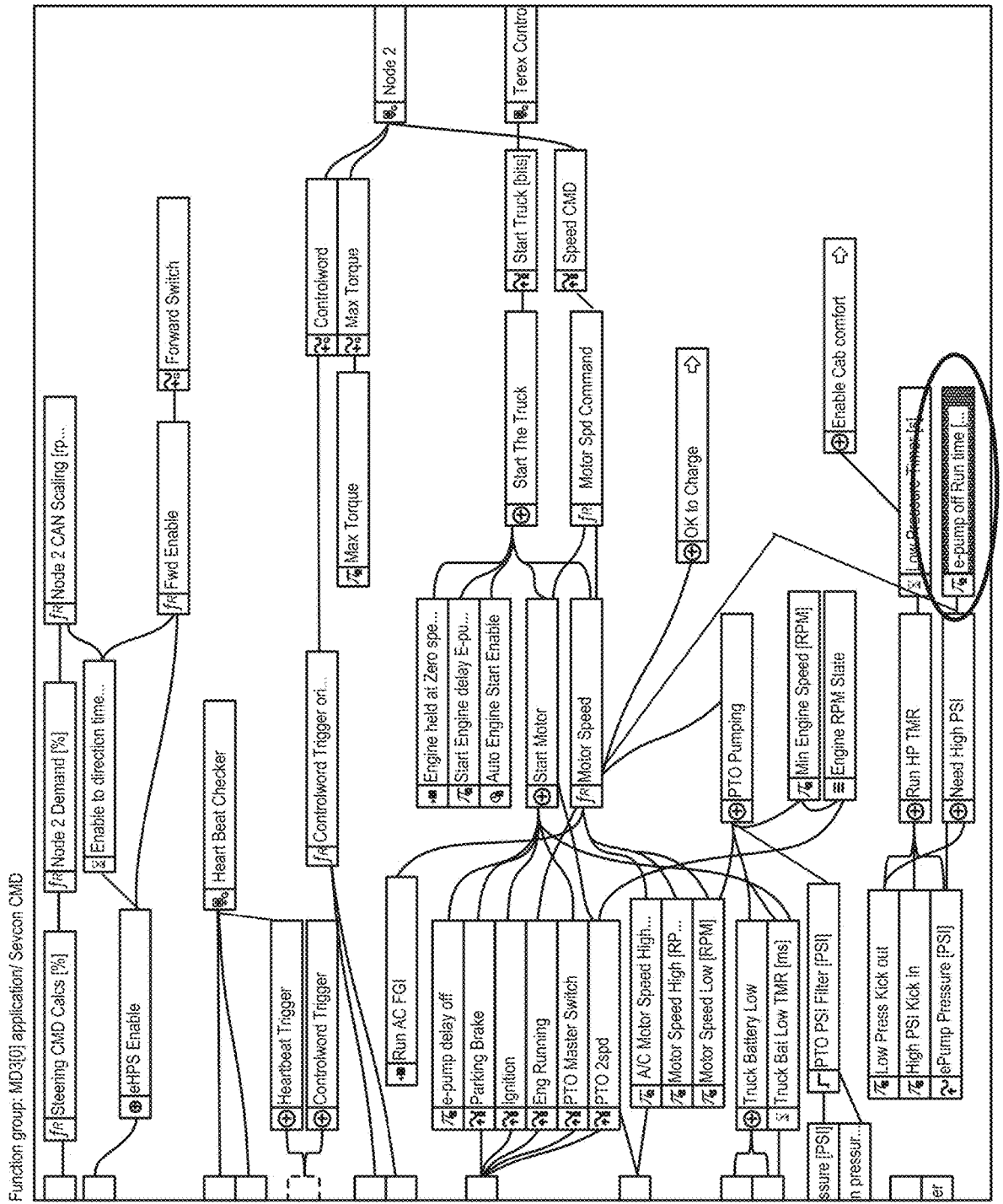

Now referring to FIG. 26, there is shown a schematic representation of details relating to how "E-pump off Run Time" is used to actively set the desired time the system needs low pressure before the electric motor speed is changed.

Figure 27:
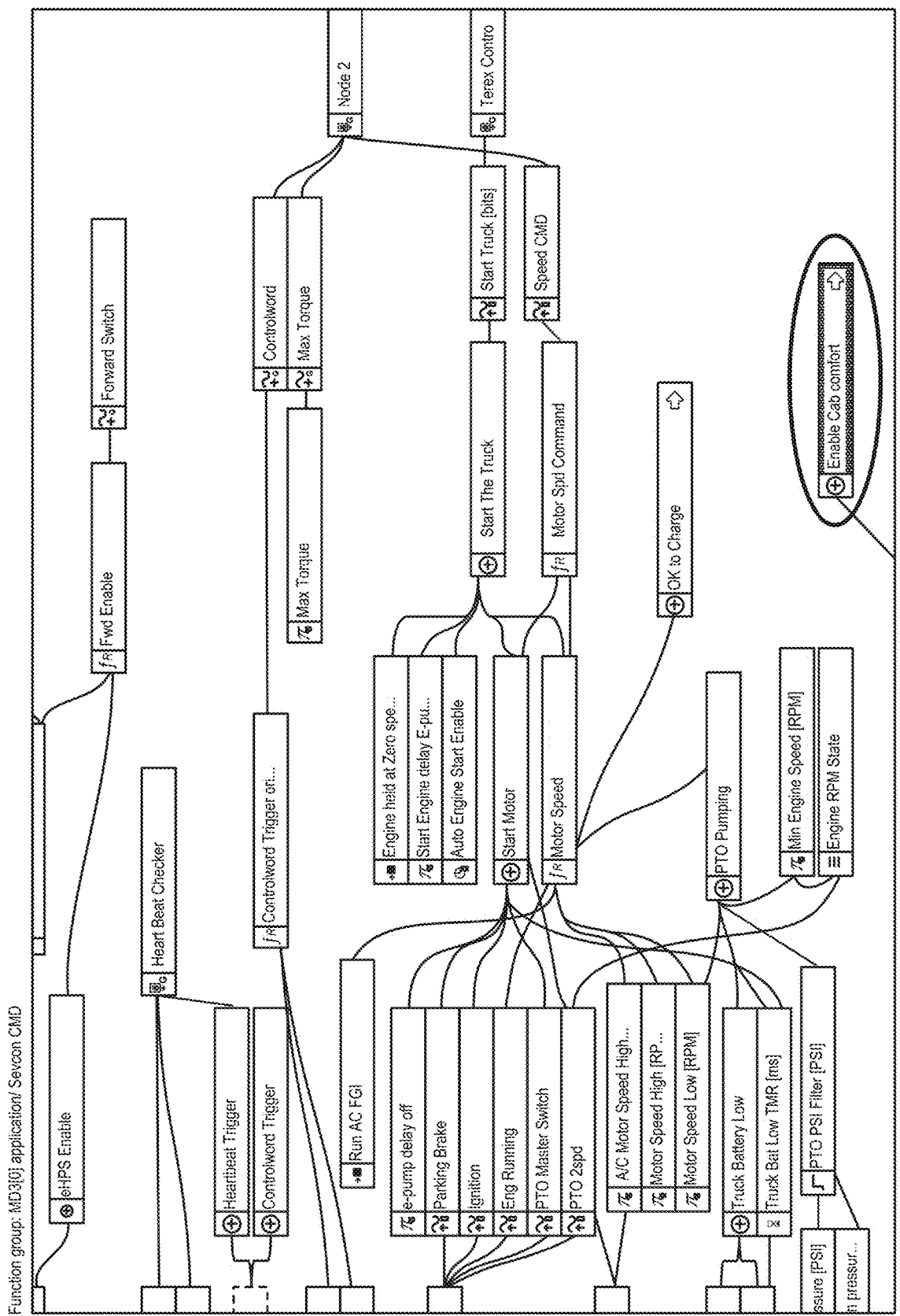

Now referring to FIG. 27, there is shown a schematic representation of details relating to how "Enable cab comfort" is used to determine the conditions when cab comfort operation is required.

Figure 28:
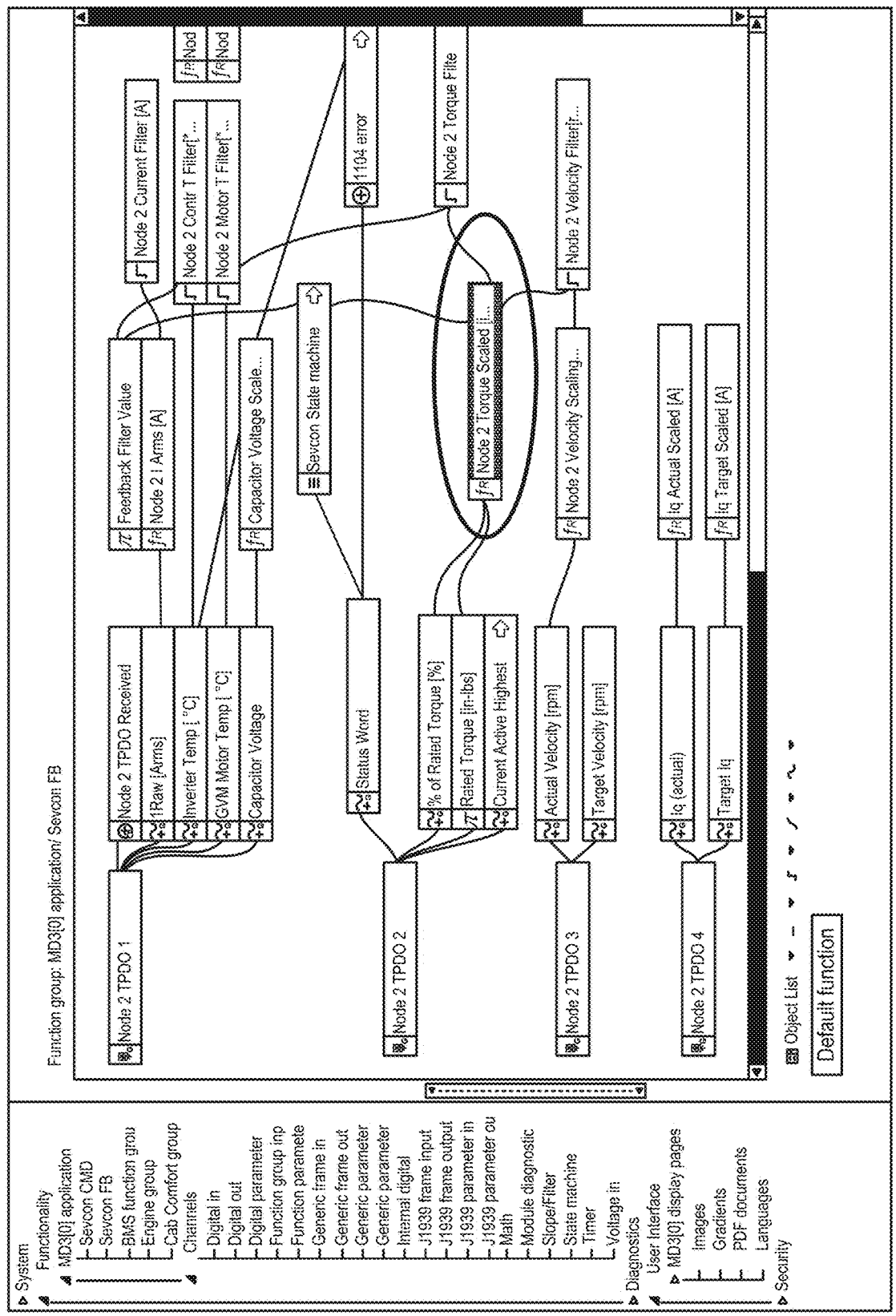

Now referring to FIG. 28, there is shown a schematic representation of details relating to how "Node 2 Torque Scaled" is used to determine the desired torque output of the electric motor, this can be adjusted to decrease power consumption.

Figure 29:
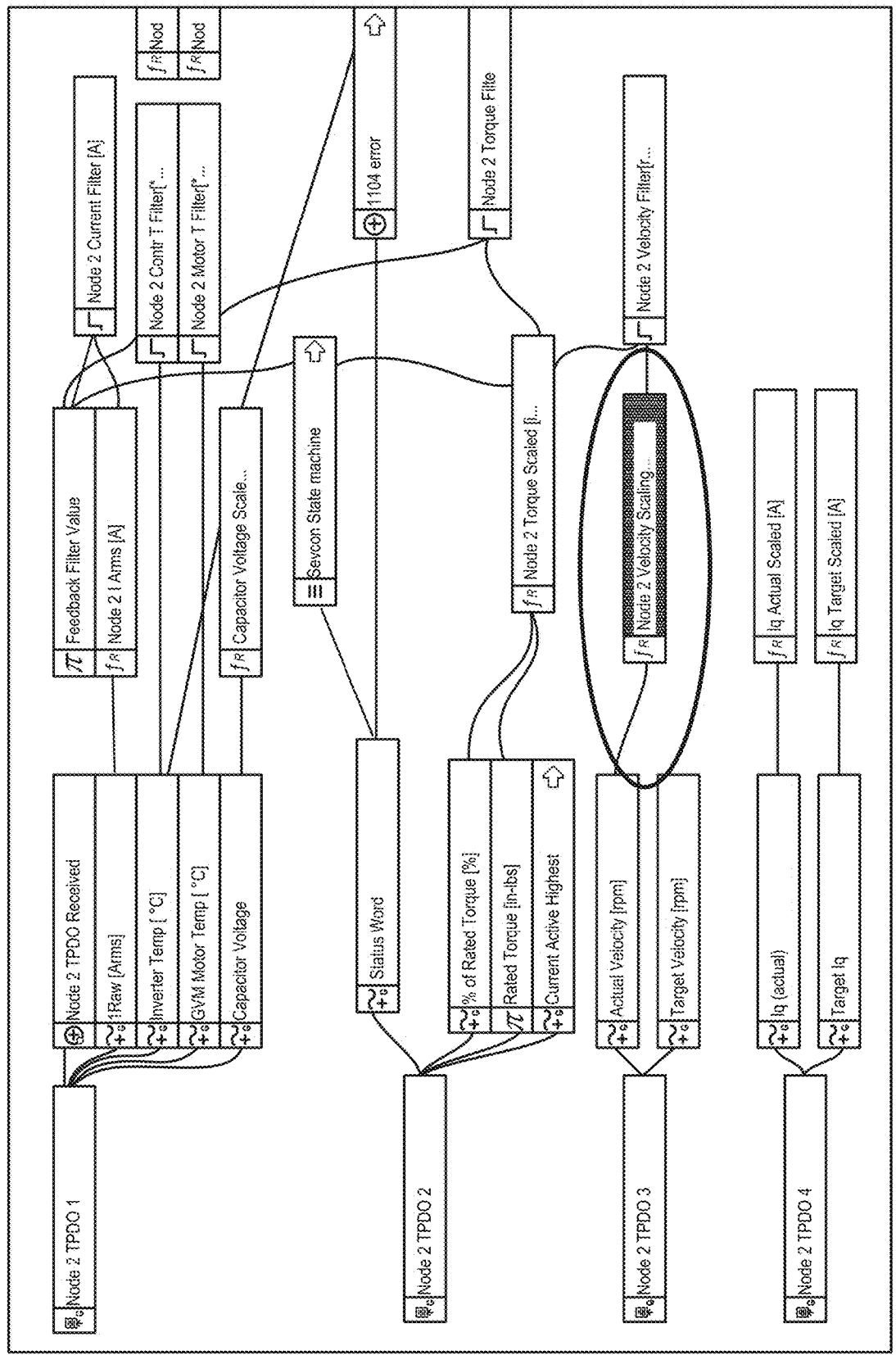

Now referring to FIG. 29, there is shown a schematic representation of details relating to how "Node 2 Velocity Scaling" is used to set the velocity to all positive since the system can run the electric motor in positive or negative direction.

Figure 30:
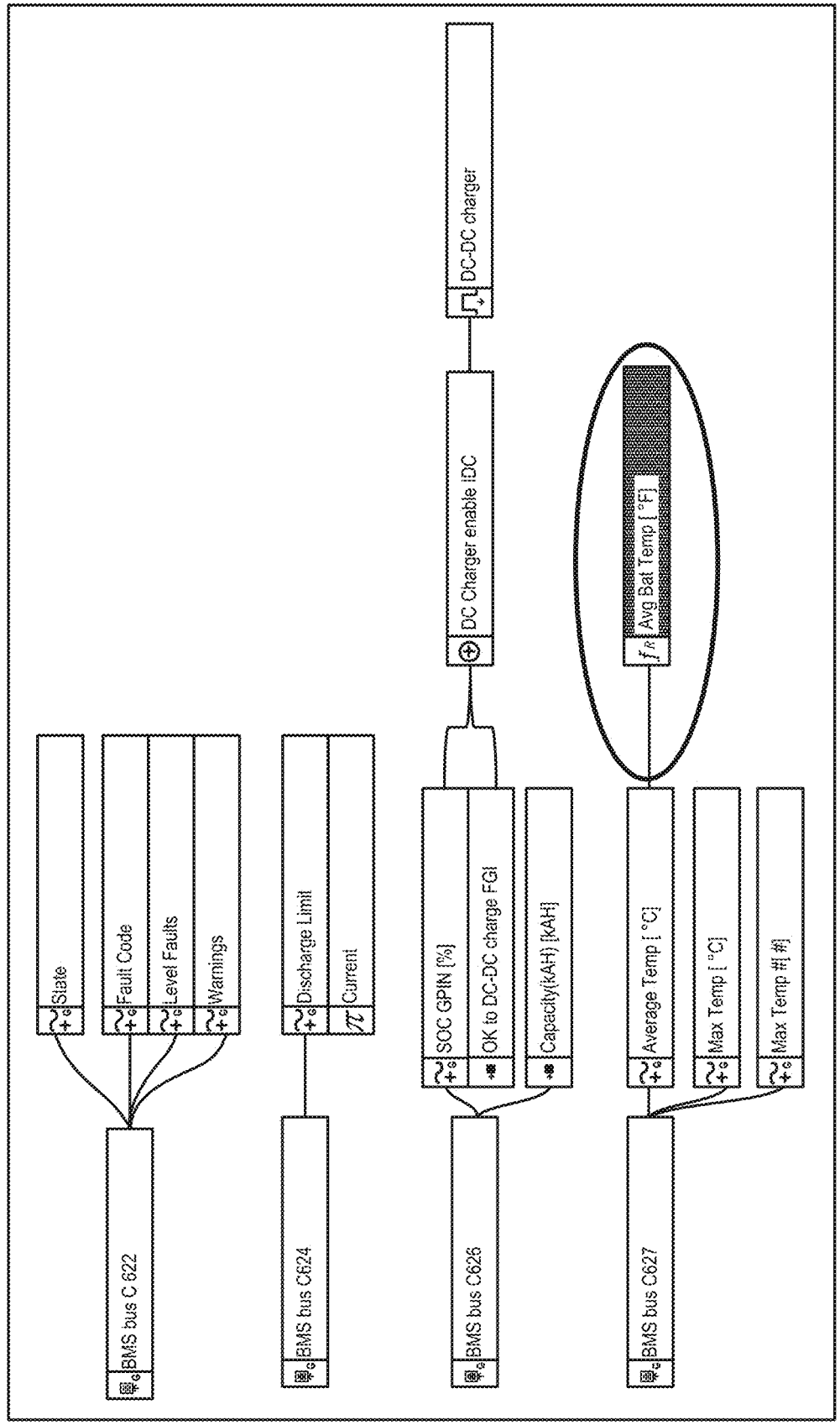

Now referring to FIG. 30, there is shown a schematic representation of details relating to how "Average Bat Temp (° F.)" is used to determine safe operating or charging conditions of the battery.

Figure 31:
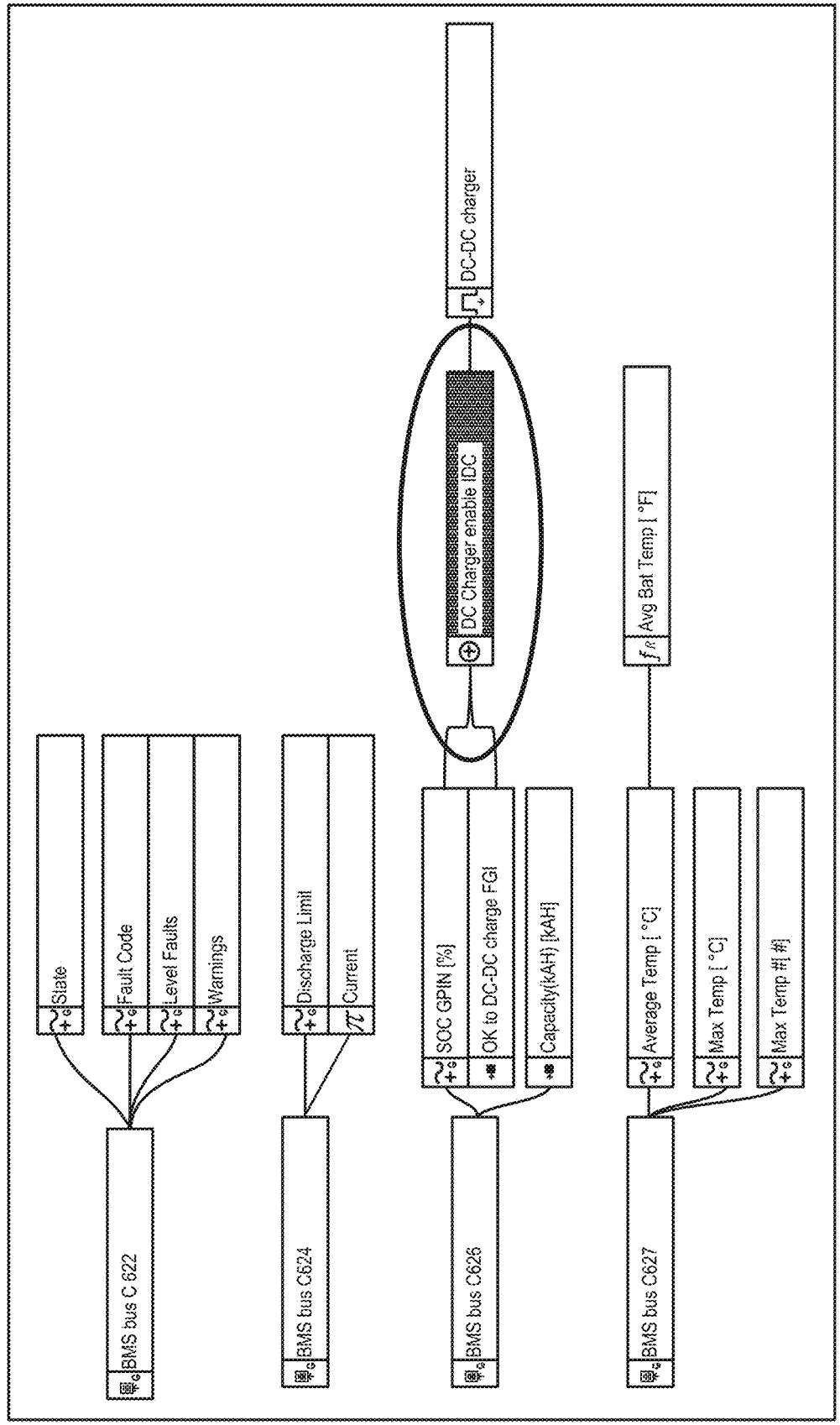

Now referring to FIG. 31, there is shown a schematic representation of details relating to how "DC Charger enable IDC" enables the output to activate the charging conditions.

Figure 32:
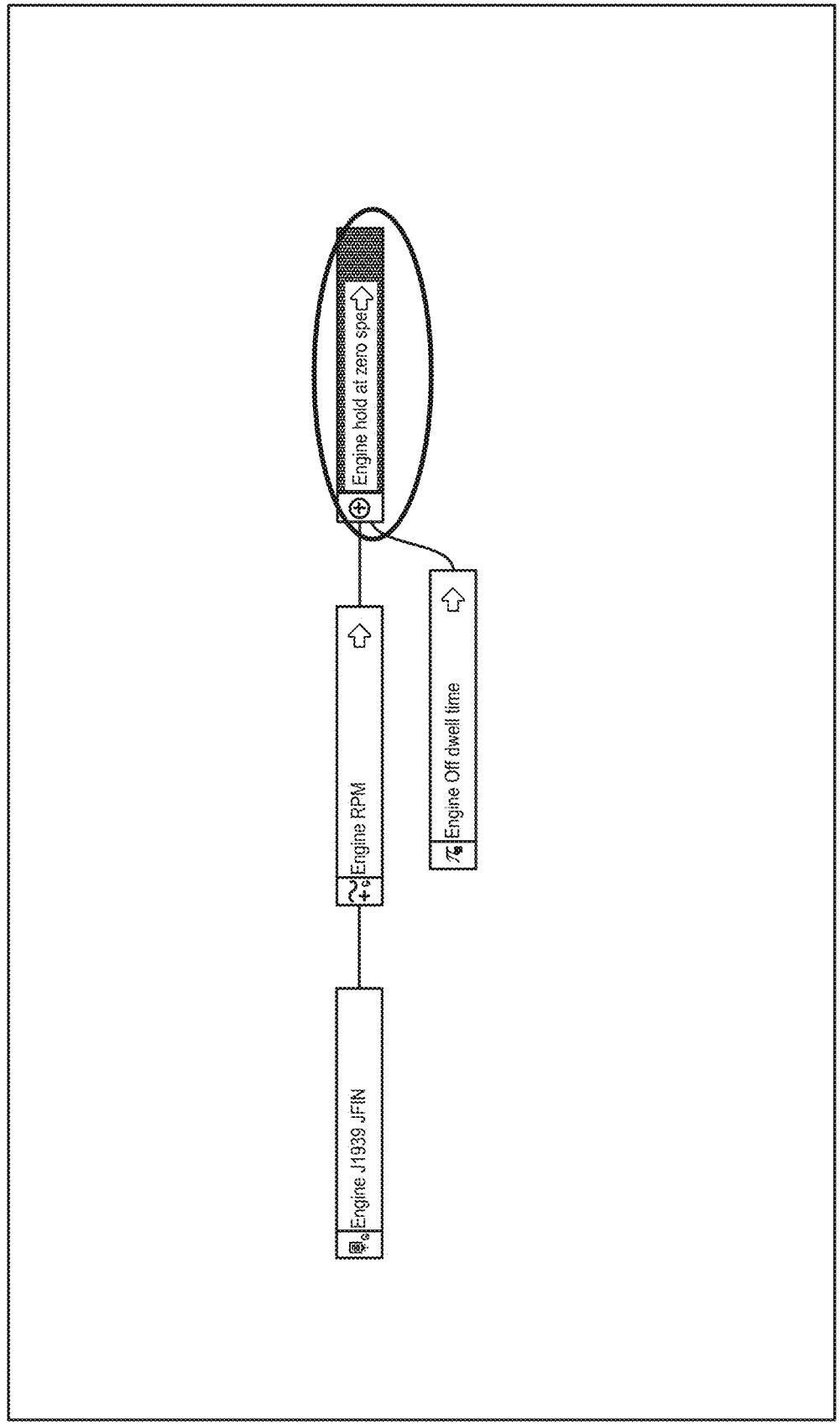

Now referring to FIG. 32, there is shown a schematic representation of details relating to how "Engine hold at zero speed" holds the engine in the off state for a determined time before it can be restarted.

Figure 33:
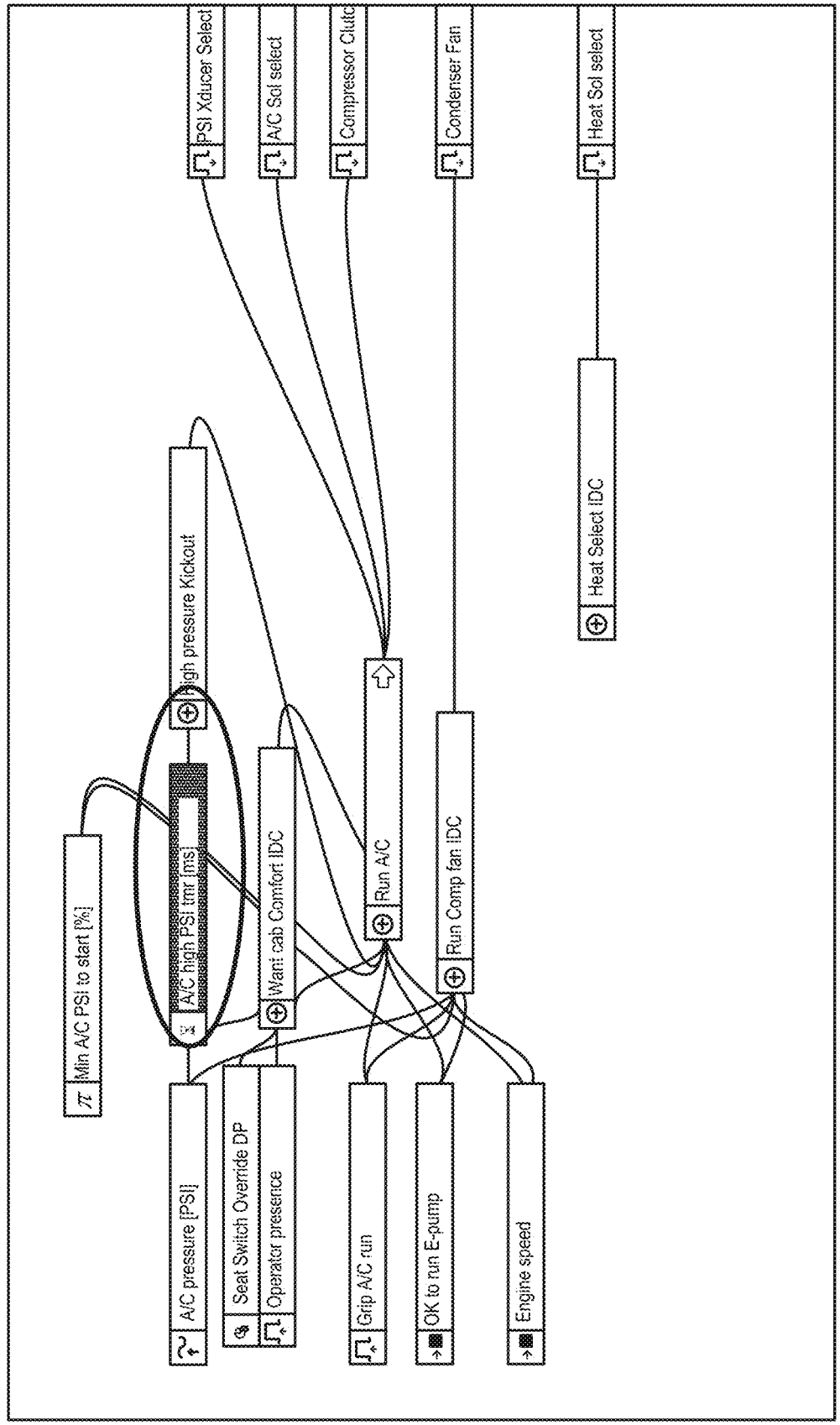

Now referring to FIG. 33, there is shown a schematic representation of details relating to how "A/C high PSI tmr"

is used to ensure safe start conditions when the air conditioning system pressure is below a certain threshold.

Figure 34:
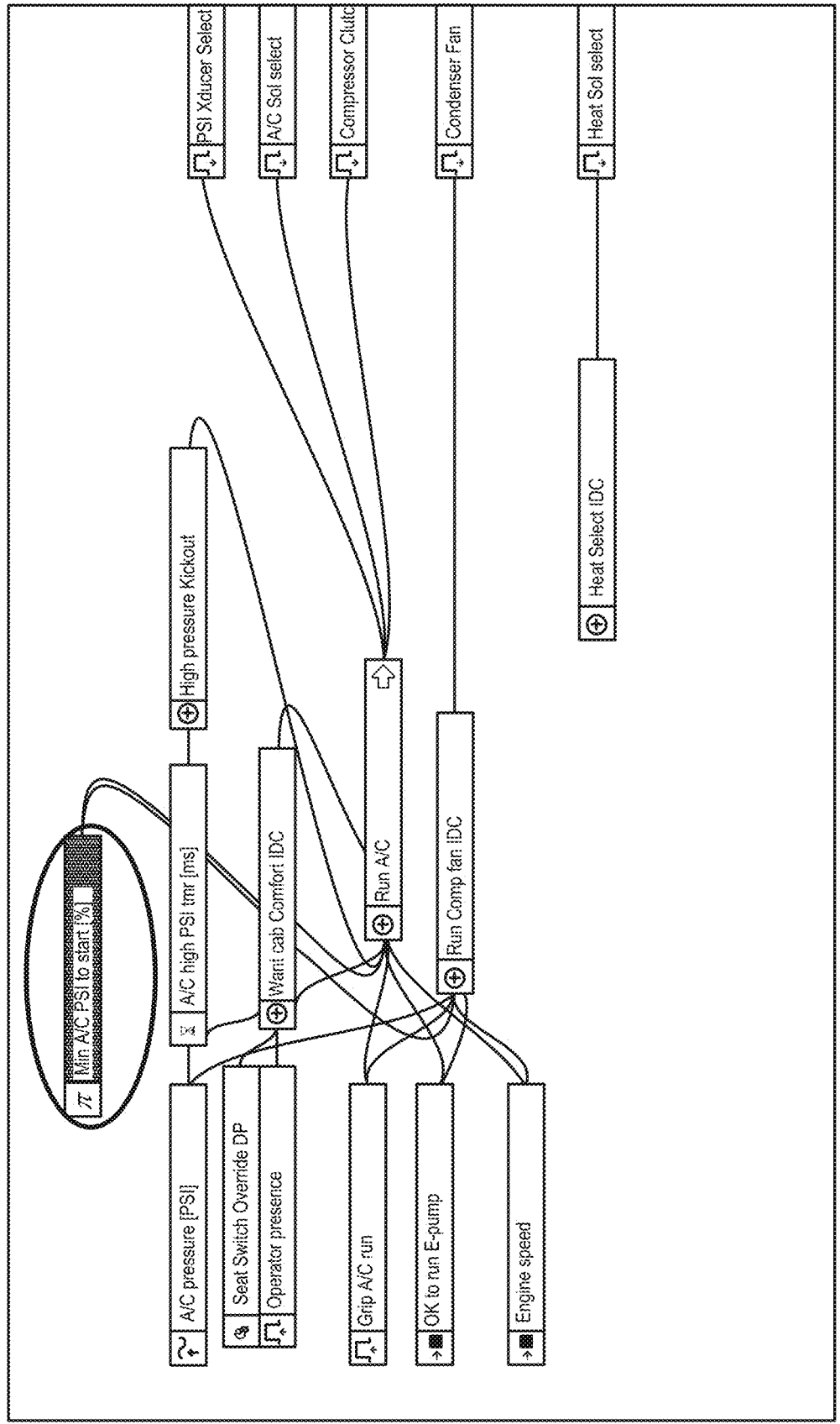

Now referring to FIG. 34, there is shown a schematic representation of details relating to how "Min A/C PSI to start" is used to provide air conditioning compressor protection in the event of a system leak or failure.

Figure 35:
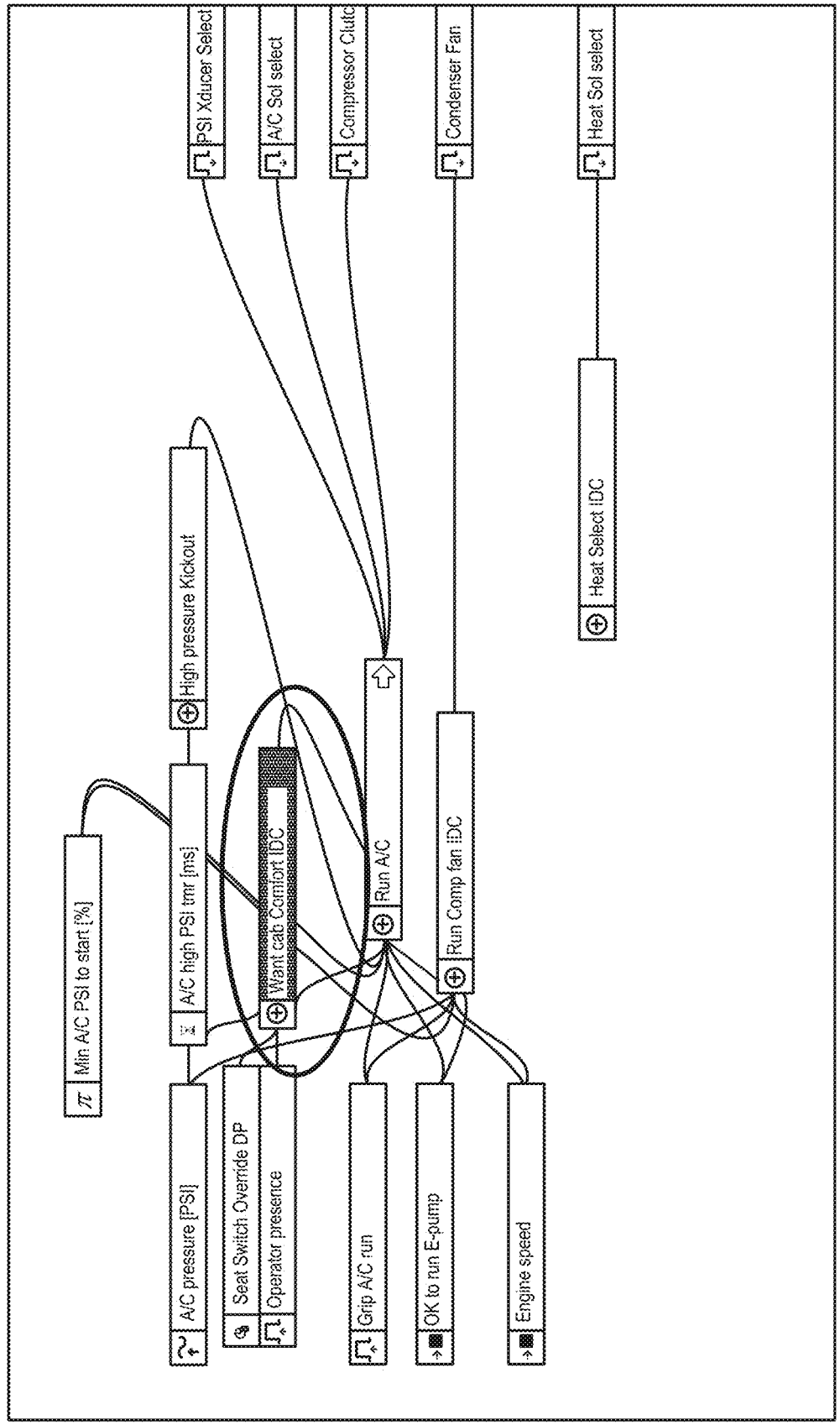

Now referring to FIG. 35, there is shown a schematic representation of details relating to how "Want cab Comfort IDC" is used to determine the auxiliary air conditioning operation based on the presence of an operator.

Figure 36:
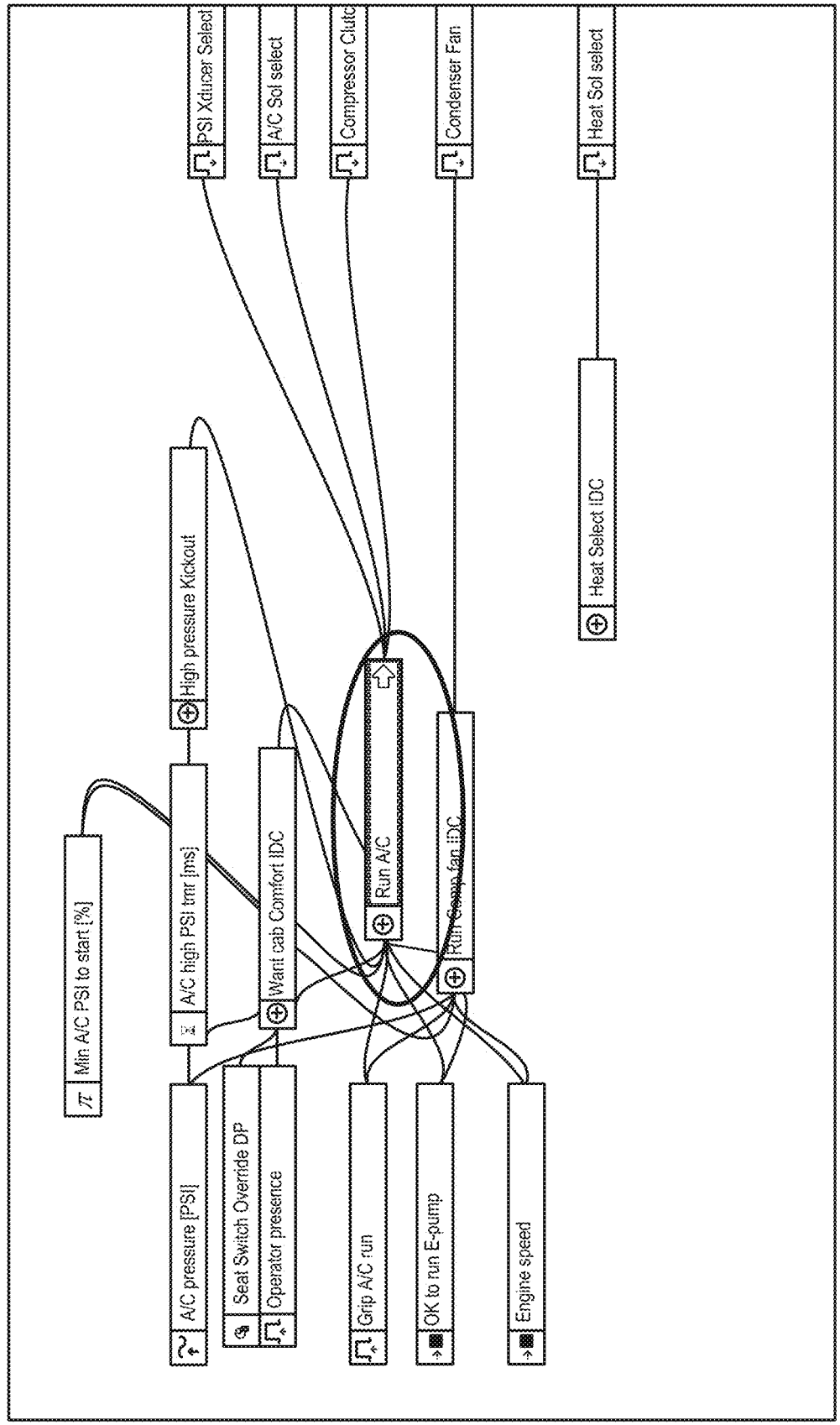

Now referring to FIG. 36, there is shown a schematic representation of details relating to how "Run A/C" is used to activate or deactivate the auxiliary air conditioning system based on operational conditions if the engine is started or the system pressure is too high.

Figure 37:
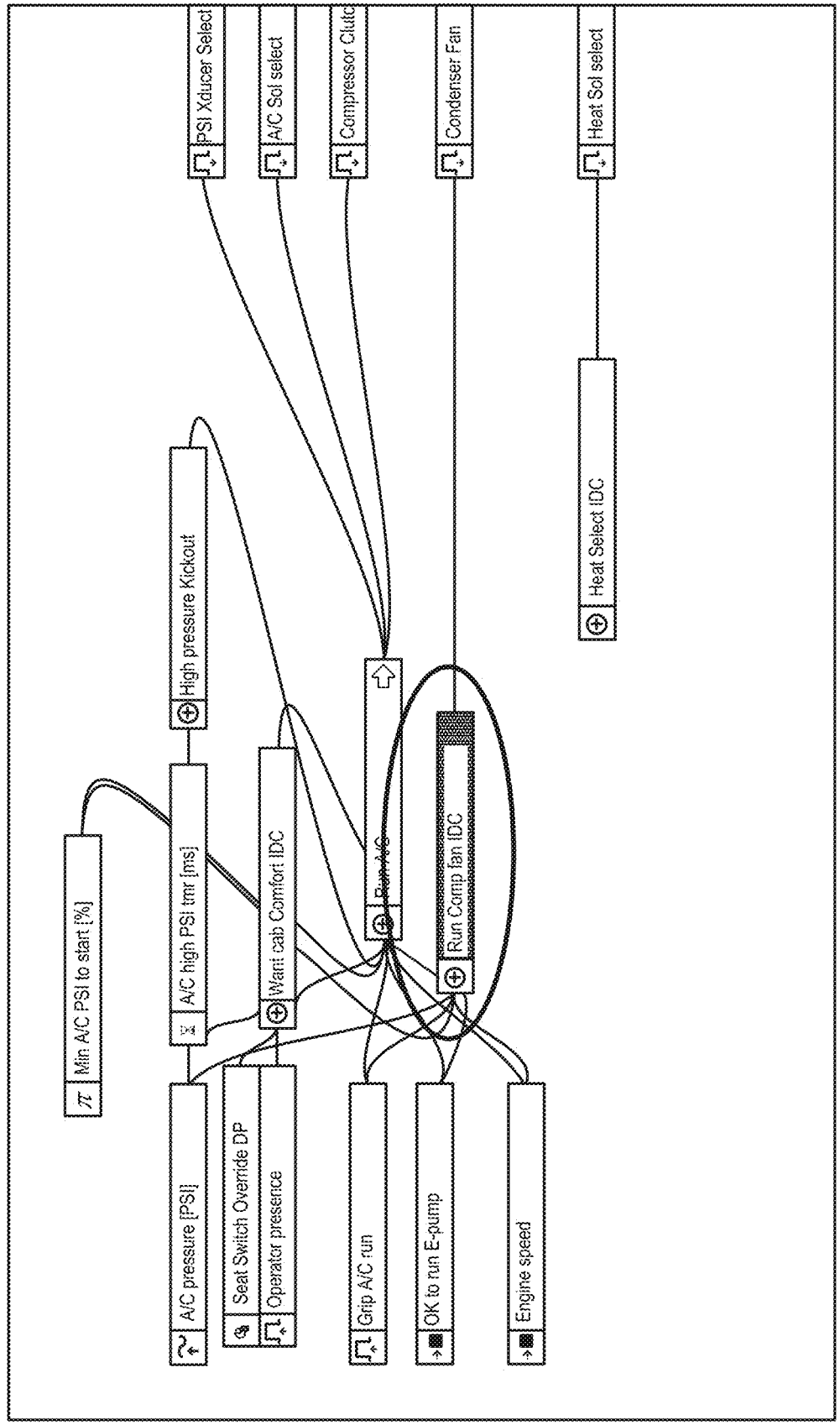

Now referring to FIG. 37, there is shown a schematic representation of details relating to how "Run Comp fan IDC" is used to determine the operational conditions of the air conditioning condenser fan. This is varied to maximize system performance while minimizing energy consumption.

Figure 38:
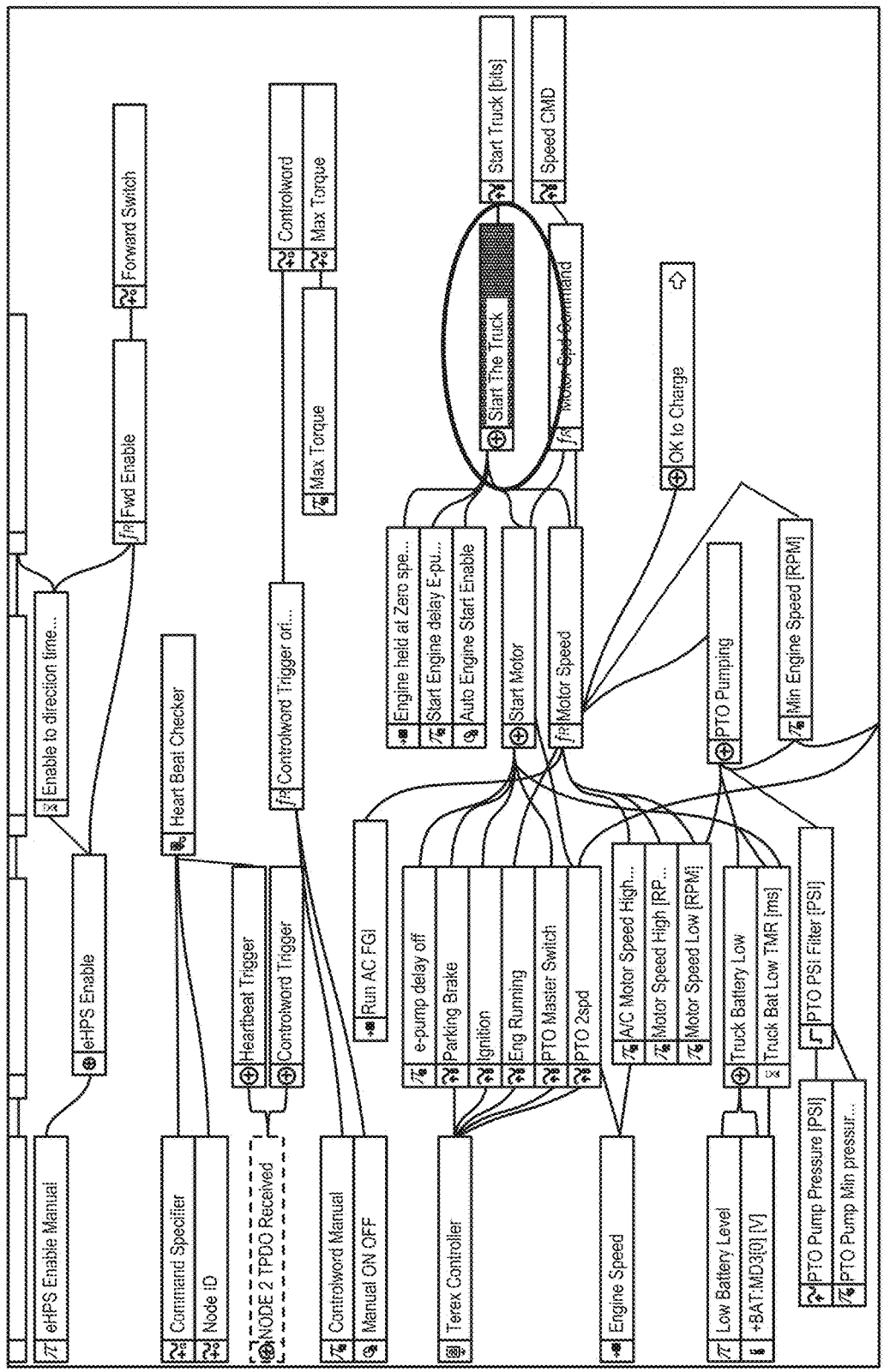
Figure 39:
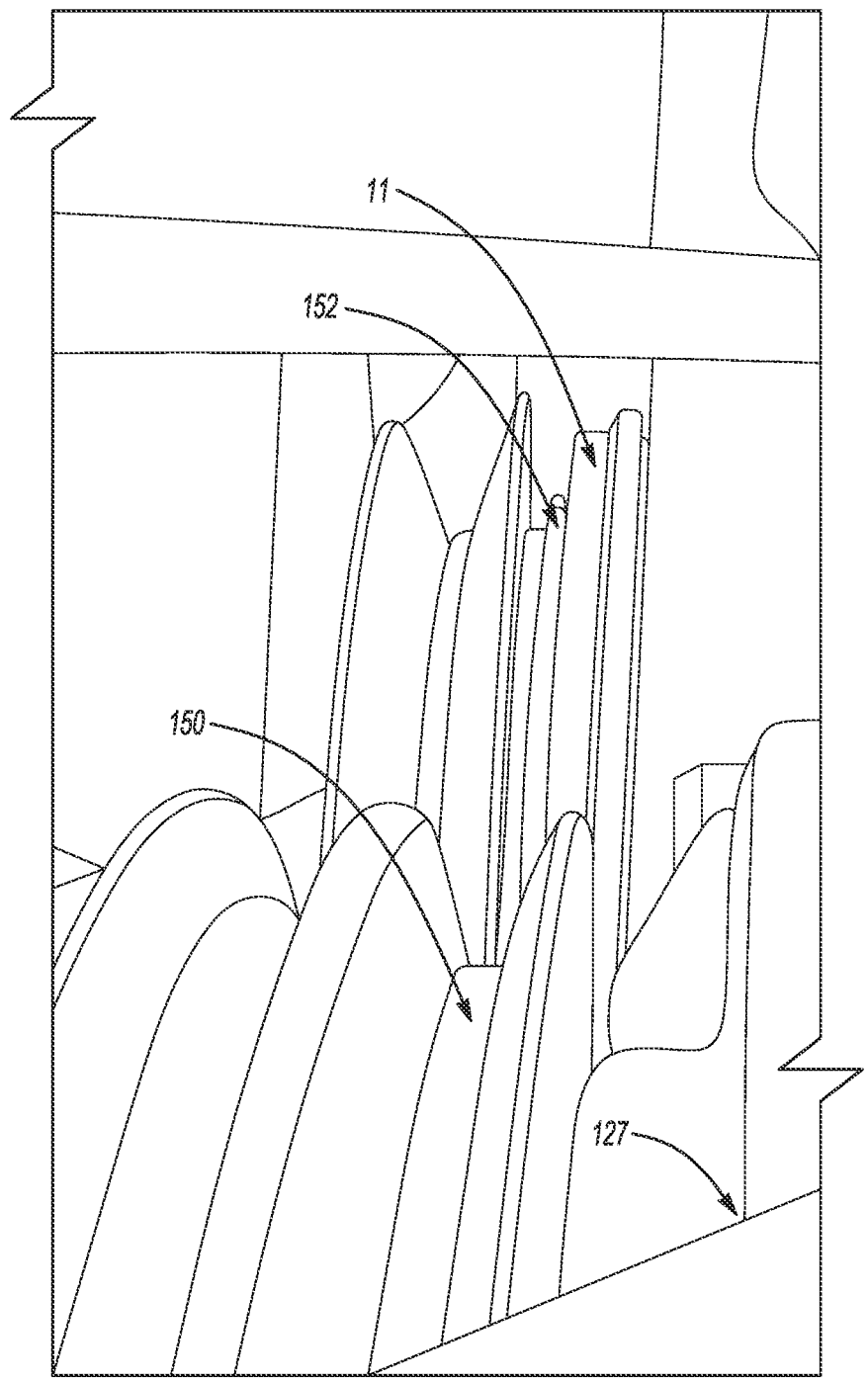
FIGS. 39-42 show representations of an actual implementation of portions of the present invention.
Figure 40:
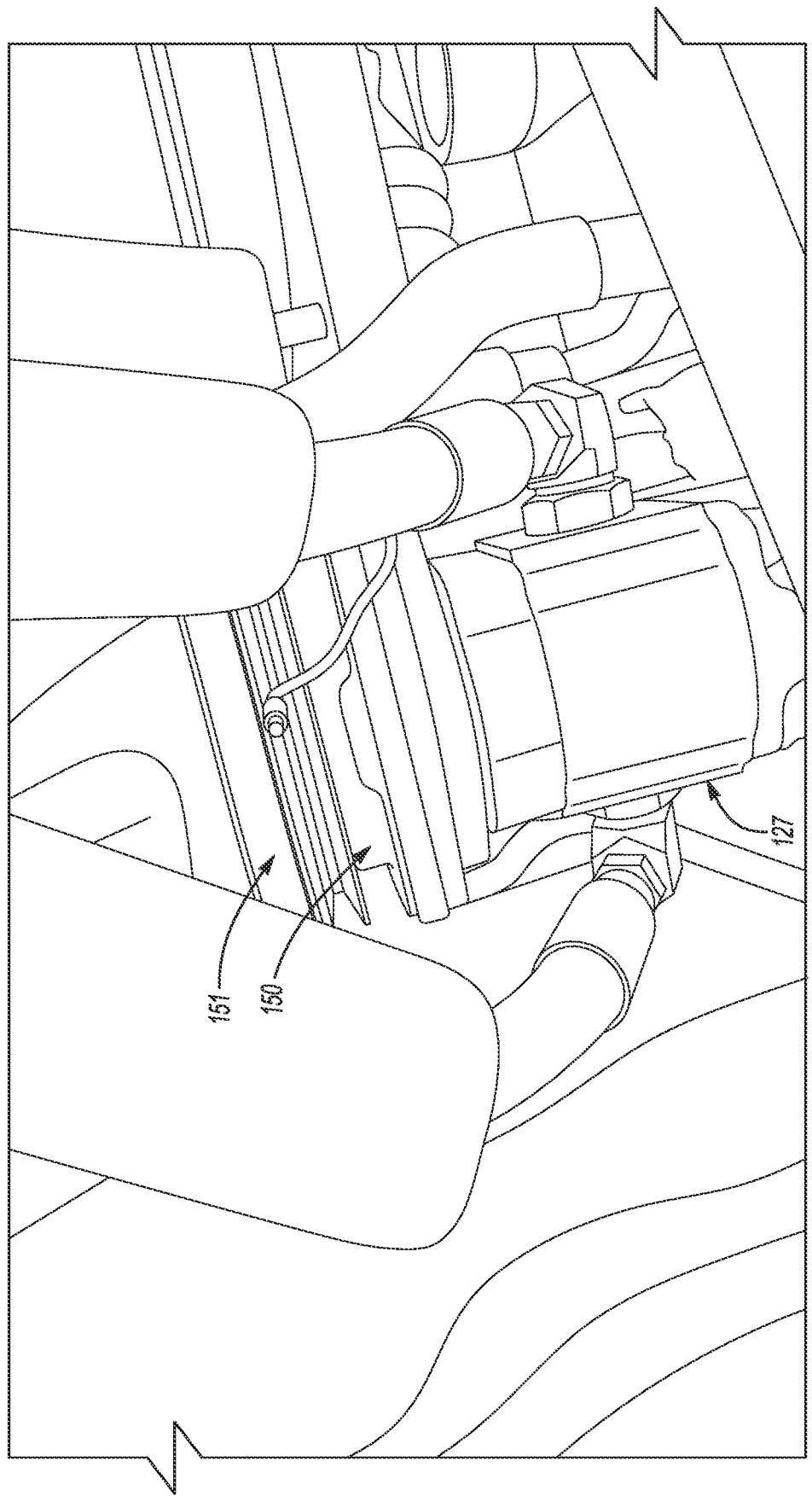
Figure 41:
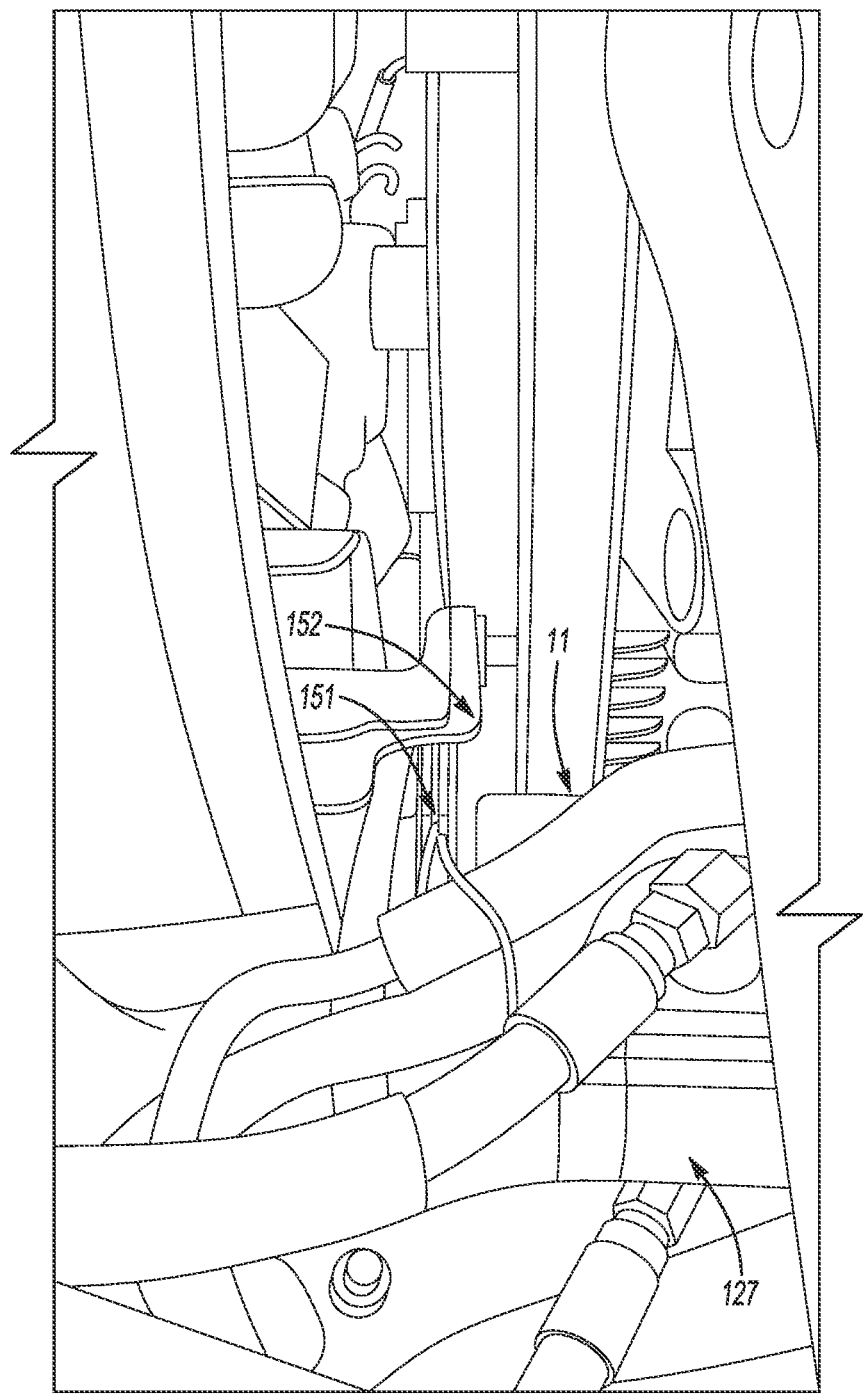
Figure 42:
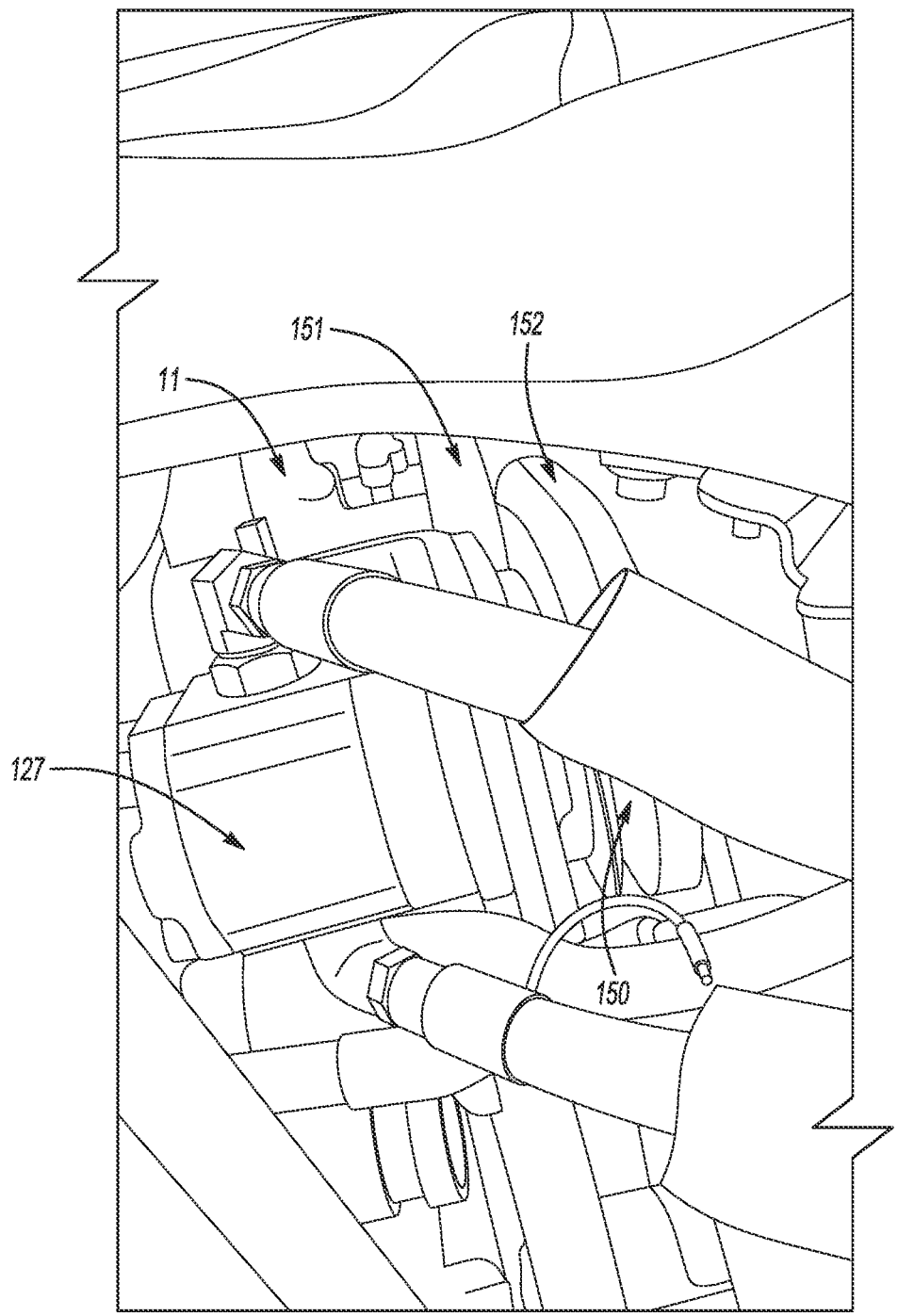

Now referring to FIG. 38, there is shown a schematic representation of details relating to how "Start the truck" uses various parameters to determine if the truck engine is required to be activated.

Now referring to FIGS. 39-42, there is shown representations of an actual implementation of portions of the present invention.

Now referring to FIG. 43, there is shown a bucket truck of the present invention.

Now referring to FIGS. 44-45, there is shown tables indicating additional duty cycle information.

One embodiment of the present invention includes the ability to conserve electric power consumed by the electric motor 110 and also can reduce idle time if the presence of the operator is detected by OPS 138 and/or by a similar device inside the bucket and during time when there is no one in the cab of the vehicle and there is someone in the bucket, the normally set cab temperature can be used upwardly for air conditioning and downwardly for heat by a preset amount, for example 20 degrees Fahrenheit. This will allow for less running of the engine and less running of the electric motor 110 but can then command the normal temperature once the operator presence is detected or the operator is detected as having exited the bucket.

Another embodiment of the present invention allows for improving the constancy of the operation of the hydraulic bucket controls during times when the vehicle engine is in transition from off to on and on to off. The pressure sensor can detect e.g. an increase of pressure generated by the PTO pump 40 during start up and can provide a signal to the controller 130 which can immediately reduce the pressure generated by pump 120. This leveling or maintaining of a constant pressure results in a more constant, smooth and predictable operation of the movement of the manipulation of the bucket.

In yet another embodiment of the present invention, the use of the output of electric motor 110 can be shared on a prioritized basis to reduce a need for oversized or dual electric motors. It is contemplated that the hydraulic controls could in some instance be given a priority over air conditioner operation to reduce the need for such oversized electric motors.

It is thought that the method and apparatus of the present invention will be understood from the foregoing description, and that it will be apparent that various changes may be made in the form, construct steps, and arrangement of the parts and steps thereof, without departing from the spirit and scope of the invention, or sacrificing all of their material advantages. The form herein described is merely a preferred exemplary embodiment thereof.

I claim:

1. A method associated with an idle managed and air conditioned truck-mounted aerial work platform, the method comprising the steps of:
   providing a first source of rotary power for driving a first shaft of an air conditioning compressor, where said first source of rotary power has a first connection with an engine of a vehicle;
   providing a second source of rotary power for driving the first shaft of the air conditioning compressor on the vehicle;
   driving a hydraulic pressure generator which has a first electrical connection to a source of stored electric energy;
   causing said second source of rotary power for driving the air conditioning compressor to drive said air conditioning compressor when said first source of rotary power for driving the air conditioning compressor is unavailable; and
   said second source of rotary power for driving said air conditioning compressor is configured to utilize said first source of rotary power for driving the air conditioning compressor, when said engine of the vehicle is running, to charge said source of stored electric energy.

2. The method of claim 1 wherein said second source of rotary power for driving an air conditioning compressor comprises: a hydraulic pump.

3. The method of claim 2 wherein said second source of rotary power for driving an air conditioning compressor further comprises a hydraulic motor.

4. The method of claim 3 wherein said second source of rotary power for driving an air conditioning compressor further comprises a first electric motor.

5. The method of claim 1 wherein said second source of rotary power for driving an air conditioning compressor comprises said first electrical connection.

6. A system associated with an idle managed and air conditioned vehicle-mounted, hydraulically manipulated and electrically insulated aerial work platform, the system comprising:
   a compressor drive system for providing an alternate source of rotary movement for driving a compressor on a vehicle where a primary source of rotary movement for driving the compressor has a first connection with a motor of the vehicle, wherein said first connection with a motor of the vehicle provides rotary movement through transmission of rotary movement;
   a compressor drive system controller configured to cause said compressor drive system to drive said compressor when said primary source of rotary movement is unavailable;
   an electric storage for providing electric energy to said compressor drive system;
   a primary hydraulic pressure generator with a primary source of driving the primary hydraulic pressure generator has a second connection to the of the vehicle; and
   an auxiliary hydraulic pressure generator with a primary source of driving the auxiliary hydraulic pressure generator has a first electrical connection to a source of stored electric energy.

7. The system of claim 6 wherein said motor is an engine.

8. The system of claim 7 wherein said engine is an internal combustion engine.

9. The system of claim 6 wherein said compressor is an air conditioning compressor.

10. The system of claim 6 wherein said electric storage is a battery.

11. The system of claim 10 wherein said motor is an internal combustion engine.

12. A system associated with an idle managed and air conditioned vehicle-mounted, hydraulically manipulated and electrically insulated aerial work platform, the system comprising:
- a compressor system for providing an alternate source of power for a compressor on a vehicle where a primary source of rotary power for driving the compressor has a first connection with motor of the vehicle;
- a compressor system controller configured to cause said compressor system to drive said compressor when said primary source of rotary power is unavailable;
- an electric storage device for providing electric energy to said compressor drive system;
- a first pump with a primary source of driving the first pump having a second connection to the motor of the vehicle; and
- a second pump with a primary driving source having a first electrical connection to a source of stored electric energy.

13. The system of claim 12 wherein said aerial work platform is truck-mounted.

14. The system of claim 12 wherein said compressor is an air conditioning compressor.

15. The system of claim 12 wherein said electric storage device is a battery.

16. The system of claim 12 wherein the first pump is a power take off (PTO) pump.

17. The system of claim 12 wherein said second pump is a hydraulic pump.

18. The system of claim 16 wherein said second pump is a hydraulic pump.

19. A method associated with an idle managed and air conditioned truck-mounted, hydraulically manipulated and electrically insulated aerial work platform, the method comprising the steps of:
- providing an alternate source of power for driving a compressor on a vehicle where a primary source of power for driving the compressor has a first connection with motor of the vehicle;
- driving an auxiliary hydraulic pressure generator which has a first electrical connection to a source of stored electric energy;
- causing said alternate source of power for driving a compressor to drive said compressor when said primary source of power for driving the compressor is unavailable; and
- said alternate source of power for driving said compressor is configured to utilize said primary source of power for driving the compressor, when said motor of the vehicle is turning, to charge said source of stored electric energy.

20. The method of claim 19 wherein said motor is an engine, and said compressor is an air conditioning compressor.

* * * * *